United States Patent [19]

Klinedinst et al.

[11] Patent Number: 5,080,928
[45] Date of Patent: Jan. 14, 1992

[54] METHOD FOR MAKING MOISTURE INSENSITIVE ZINC SULFIDE BASED LUMINESCENT MATERIALS

[75] Inventors: Keith A. Klinedinst, Marlboro; Richard A. Gary, Everett; Silvia E. Lichtensteiger, Acton, all of Mass.

[73] Assignee: GTE Laboratories Incorporated, Waltham, Mass.

[21] Appl. No.: 593,451

[22] Filed: Oct. 5, 1990

[51] Int. Cl.$^5$ .......................... B05D 5/12; B05D 7/00; C23C 16/00; C23C 16/44
[52] U.S. Cl. ........................................ 427/70; 427/66; 427/69; 427/213; 427/215; 427/220; 427/255.2; 427/255.6
[58] Field of Search .................. 427/66, 69, 70, 213, 427/215, 220, 255.2, 255.6; 428/570

[56] References Cited

U.S. PATENT DOCUMENTS

| | | | |
|---|---|---|---|
| 4,585,673 | 4/1986 | Sigai | 427/213 |
| 4,855,189 | 8/1989 | Simopoulos et al. | 428/690 |

FOREIGN PATENT DOCUMENTS

| | | |
|---|---|---|
| 175567 | 7/1986 | Japan . |
| 63-224943 | 3/1987 | Japan . |
| 1110955 | 10/1987 | Japan . |

OTHER PUBLICATIONS

A. G. Fisher et al., Advances in AC-Electroluminescent Powder Layers, SPIE vol. 99 3rd European Electro-Optics Conf. (1976) pp. 202-208.
S. Roberts, Aging Characteristics of Electroluminescent Phoshors, Jour. of Appld. Phys. vol. 28, No. 2, Feb. 1957 pp. 262-265.
W. A. Thornton, Electroluminescence Maintence, J. of Electrochemical Soc., vol. 107, No. 11, (Nov. 1960) pp. 895-907.
K. Wefers, G. M. Bell "Oxides and Hydroxides of Aluminum" Tech. Paper 19, Alcoa Research Lab., East St. Louis, 111 1972.
T. A. Mole, E. A. Jeffery, "Organoaluminium Compounds" Elsevier Publishing Co, Amsterdam, 1972 Chapter 8.

*Primary Examiner*—Shrive Beck
*Assistant Examiner*—Margaret Burke
*Attorney, Agent, or Firm*—Carl F. Ruoff

[57] ABSTRACT

A process is disclosed for coating phosphors with hydrolyzed alkylaluminum. The hydrolyzed alkylaluminum coating renders the phosphors insensitive to atmospheric moisture. the coating process involves vaporizing an aluminum-containing precursor such as trimethylaluminum or triethylaluminum in an inert gas stream and passing this through a fluidized bed containing the phosphor particles. Water vapor is also passed through the fluidized bed and the water and aluminum precursor react on the surface of the phosphor particles to form hydrolyzed trimethylaluminum or other alkylaluminum. The hydrolyzed trimethylaluminum or other alkylaluminum phosphors are particularly useful in electroluminescent lamps.

7 Claims, 26 Drawing Sheets

METHOD FOR MAKING MOISTURE INSENSITIVE ZINC SULFIDE BASED LUMINESCENT MATERIALS

BACKGROUND OF THE INVENTION

The present invention describes a process for coating finely divided material with hydrolyzed aluminum. More specifically electroluminescent phosphors coated with hydrolyzed trimethyl aluminum have been produced which are almost completely insensitive to atmospheric moisture.

Zinc sulfide-based phosphors, typically doped with copper, may be stimulated to emit visible light by the absorption of electrical energy in a so-called electroluminescent lamp where a layer of the phosphor is sandwiched between a front transparent electrode and a back non-transparent electrode with a layer of insulating material (typically barium titanate) sandwiched between the phosphor layer and the back electrode. However, the luminescent efficiency of the phosphor degrades much more rapidly if the phosphor is exposed to a moisture-containing atmosphere than if it is exposed to a very dry atmosphere. The invention which is the subject of this disclosure was motivated by a desire to reduce the moisture sensitivity of such zinc sulfide-based phosphors. The selected approach was to form a thin yet continuous coating of hydrolyzed trimethyl aluminum (TMA) upon the surfaces of the zinc sulfide particles, thereby protecting them from the effects of atmospheric moisture.

The hydrolyzed TMA coatings are formed via chemical vapor deposition with the phosphor particles suspended within a gas-fluidized bed. Hydrolyzed TMA, presumably consisting mainly of relatively amorphous aluminum hydroxide, was selected as a coating material principally because it can be formed at relatively low temperatures by the reaction of gaseous TMA with gaseous water molecules without the use of oxygen or any other coreactant. In this way, the coatings can be formed under conditions that are least likely to modify the surface chemical composition of the relatively reactive zinc sulfide based phosphor.

SUMMARY OF THE INVENTION

The present invention describes a process for forming a coating of hydrolyzed trimethyl aluminum on the outer surfaces of phosphor particles. Trimethyl aluminum is vaporized in an inert carrier gas and water is likewise vaporized in an inert carrier gas. The two carrier gas streams are passed through a fluidized bed of phosphor particles wherein the trimethyl aluminum reacts with the water on the phosphor particle surfaces to form a coating of hydrolyzed trimethyl aluminum. The coated phosphor shows an extreme insensitivity to atmospheric moisture.

In another aspect of the invention phosphor powder particles are coated with hydrolyzed trimethyl aluminum and used in electroluminescent lamps. The coated phosphor is sandwiched between a transparent electrode and a second electrode. The manufactured electroluminescent lamp is resistant to atmospheric moisture.

For a better understanding of the present invention together with other objects, advantages and capabilities thereof, reference is made to the following disclosure and appended claims in connection with the above described drawing.

DETAILED DESCRIPTION OF THE PREFERRED EMBODIMENTS

Figure 1:
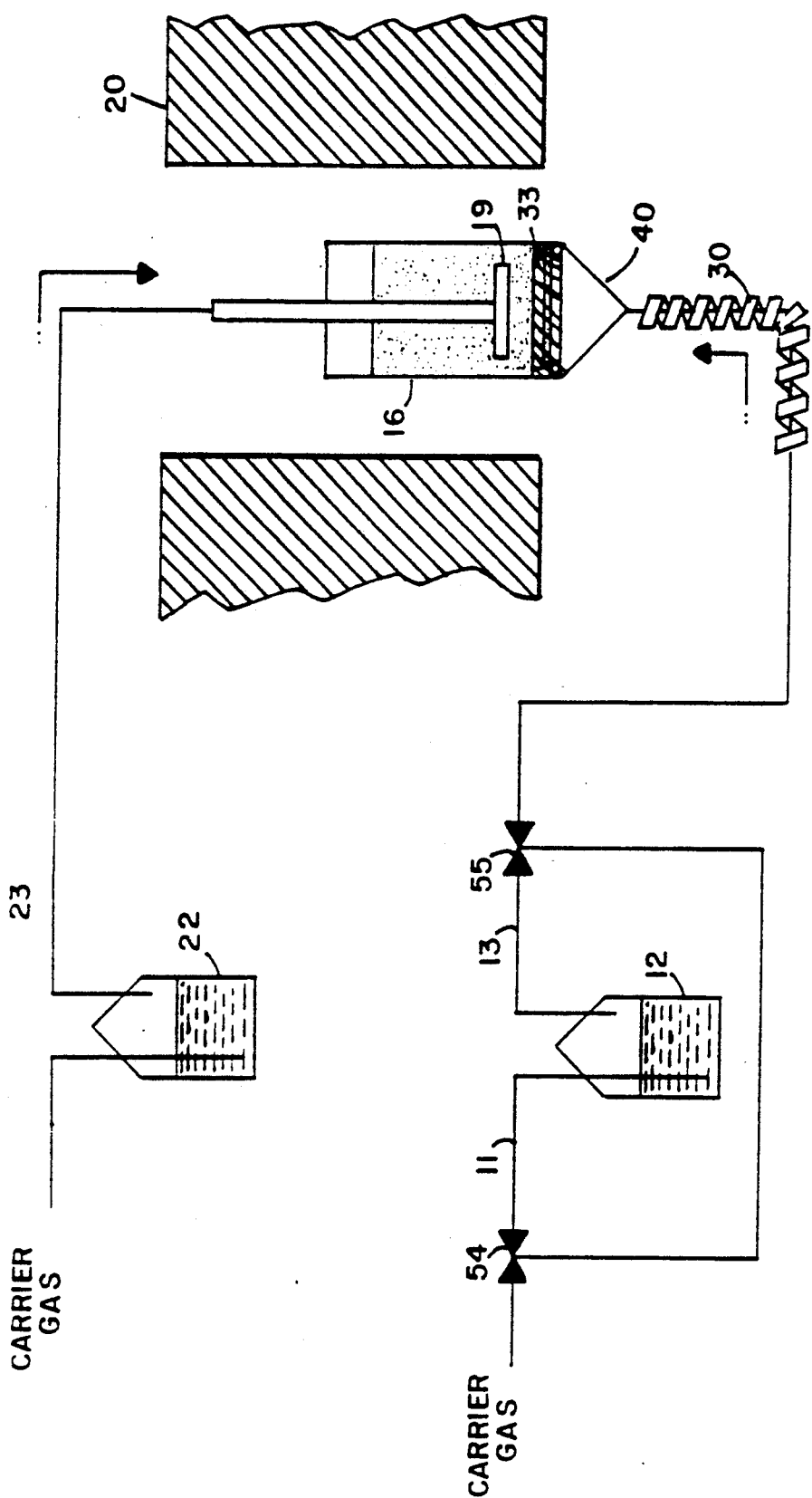
FIG. 1 shows a schematic drawing of the apparatus used to carry out the coating reactions.

The hydrolyzed TMA coatings of the present invention where applied via a chemical vapor deposition (CVD) technique. FIG. 1 shows a schematic of the system used to carry out the CVD coatings.

Trimethyl aluminum ($Al(CH_3)_3$) was used as the organo-metallic coating precursor. Prior to entering the fluidized bed 16, part or all of the inert fluidizing gas or carrier gas was passed through a bubbler 12 filled with liquid TMA heated to a temperature high enough to produce a TMA equilibrium vapor pressure sufficient to yield the desired coating rate (typically between 25° and 35°·C). The carrier gas flow was controlled by valves 54 and 55. The inert fluidizing gas was nitrogen. However, argon can also be used. The portion of the fluidizing gas line 13 located between the bubbler outlet and the fluidized bed inlet 40 was heated by a heating tape 30 to a temperature a few degrees above the TMA bubbler temperature in order to prevent condensation of the TMA within the gas lines. The fluidized bed itself was heated to a temperature of between 150° and 250° C. by furnace 20 during the coating process.

Once within the fluidized bed, the TMA is hydrolyzed by reaction with gaseous water vapor which is transported into the reactor via a second stream of inert gas such as nitrogen or argon through line 23. This inert gas stream is passed through a water-filled bubbler 22 before entering the fluidized bed via a hollow tube which terminates at a point 19 above but not too far from the fluidized bed gas distributor 33. The water bubbler temperature and the flow rate of the water-containing inert gas stream are adjusted so as to deliver a quantity of water to the fluidized-bed reactor 16 sufficient to react completely with all of the TMA molecules entering the reactor via the fluidizing gas stream. It is best to have a relatively large excess of water present within the reactor so as to ensure that all of the TMA molecules will be completely hydrolyzed. A five to fifteen fold excess is desirable although the reaction will work with just a three fold excess. The reaction is allowed to proceed until the desired quantity of hydrolyzed TMA coating has been produced.

Once the desired thickness of the hydrolyzed TMA coating has formed on the phosphor particles, the reaction is stopped, the fluidized bed is allowed to cool in an inert gas stream and the coated phosphor particles are removed from the tubular reactor.

When the hydrolyzed TMA-coated ZnS phosphors are examined by X-ray photoelectron spectroscopy, the virtual absence of emitted electrons originating from Zn, S, or Cu atoms indicates that the hydrolyzed TMA coatings are continuous, i.e. completely covering the surface of each phosphor particle.

Sylvania Type 723 ZnS:Cu EL phosphor was used in the Examples 1-6. The uncoated and hydrolyzed TMA coated phosphors were thoroughly dispersed in a polymeric organic binder (a mixture of cyanoethyl cellulose and cyanoethyl sucrose). Subsequently, thin layers of the uncoated and coated phosphor dispersions were formed upon the surfaces of transparent sheets of glass or Mylar that had first been coated with thin transparent indium-tin oxide (ITO) which serves as the front transparent electrode for the EL lamp. A layer of insulating barium titanate, dispersed in the same polymeric organic binder, was subsequently formed on top of each phosphor layer. Finally, layers of conductive carbon to serve as the rear lamp electrode, were formed upon the surfaces of the barium titanate layers. Copper mesh current collectors were attached to each electrode. In some cases, the finished lamps were sealed between two sheets of Aclar (a special fluorohalocarbon-based, water impermeable transparent plastic manufactured by Allied Chemical Corp.) using conventional laminating heat sealing equipment.

All weight percents of the hydrolyzed TMA coatings are based on the measured aluminum content which is converted to an equivalent weight percent of aluminum hydroxide ($Al(OH)_3$). In the discussion that follows, the coating is not pure aluminum hydroxide.

EXAMPLE 1

Four 300 gm quantities of the copper-doped zinc sulfide electroluminescent phosphor (lot 361S of Type 723 phosphor available from Sylvania) were coated using the reaction conditions listed in Table 1. Samples 320-90, 327-90, 403-90 and 416-90, were coated for 1 ⅓ hours, 2 ⅔ hours, 5 ⅓ hours, and 5 ⅓ hours, respectively. Sample 320-90 was prepared using a 250° C. reaction temperature, while a 200° C. temperature was used to prepare the samples 327-90 and 403-90. Sample 416-90 was prepared using a 123° C. coating reaction temperature. The $H_2O$ bubbler and TMA bubbler temperatures are shown in Table 1.

TABLE 1

| | | | Reaction Condition Summary | | | | |
|---|---|---|---|---|---|---|---|
| Sample No. | Phosphor Lot/ Sample Weight | Reaction Temp. | Equivalent $Al(OH)_3$ w/o | $H_2O$ Bubbler Temp. | $N_2$ Flow Rate Thru $H_2O$ Bubbler | TMA Bubbler Temp. | $N_2$ Flow Rate Thru TMA Bubbler | Reaction Time |
| 320-90 | 361S/300 gm | 250° C. | 1.01 | 69° C. | 1 l/min | 30° C. | 0.5 l/min | 1⅓ hr |
| 327-90 | 361S/300 gm | 200° C. | 1.89 | 68° C. | 1 l/min | 30° C. | 0.5 l/min | 2⅔ hr |
| 403-90 | 361S/300 gm | 200° C. | 2.96 | 67° C. | 1 l/min | 30° C. | 0.5 l/min | 5⅓ hr |
| 416-90 | 398S/300 gm | 123° C. | 3.53 | 57° C. | 1 l/min | 30° C. | 0.25 l/min* | 5⅓ hr |
| 508-90 | 361S/300 gm | 200° C. | 6.1 | 70° C. | 1 l/min | 30° C. | 0.5 l/min | 5⅓ hr |
| 514-90 | 398S/300 gm | 200° C. | 5.8 | 70° C. | 1 l/min | 30° C. | 0.5 l/min | 5⅓ hr |
| 521-90 | 361S/300 gm | 200° C. | 5.4 | 70° C. | 1 l/min | 30° C. | 0.5 l/min | 5⅓ hr |

TABLE 1-continued

| | | | | Reaction Condition Summary | | | | |
|---|---|---|---|---|---|---|---|---|
| Sample No. | Phosphor Lot/ Sample Weight | Reaction Temp. | Equivalent Al(OH)₃ w/o | H₂O Bubbler Temp. | N₂ Flow Rate Thru H₂O Bubbler | TMA Bubbler Temp. | N₂ Flow Rate Thru TMA Bubbler | Reaction Time |
| 612-90 | 361S/300 gm | 200° C. | | 70° C. | 1 l/min | 30° C. | 0.5 l/min | 5¼ hr |

*Diluted with an additional 0.25 l/min flow of purified nitrogen

Electroluminescent lamps were subsequently fabricated with ITO-coated plate glass serving as the transparent support/transparent front electrode. Additional lamps were similarly fabricated using the virgin (uncoated) phosphor, rather than one of the coated phosphor samples. All of these lamps, without being packaged or in any way protected from ambient laboratory temperature and humidity, were continuously driven using a 120 V a.c. power supply operated at 400 Hz. At least two lamps made from each coated phosphor were tested against a lamp made from the uncoated reference material. The lamp brightnesses were recorded as a function of time using a calibrated photodiode detector. The maximum brightnesses measured with the uncoated and coated-phosphor lamps, the ratio of the maximum brightnesses (coated versus uncoated), and the ratio of the half-life values obtained with the uncoated and coated phosphor-containing lamps are all listed in Table 2 for each of the coated-phosphor samples (320-90, 327-90, 403-90 and 416-90). The half-life of a lamp is the time required for the measured brightness to drop to exactly half of its initial maximum value.

As shown in Table 2, the maximum brightnesses measured with the lamps containing the four coated materials were all within 10% of that measured with the corresponding uncoated-phosphor control lamps. Also, the half-lives of the coated phosphor-containing lamps were all more than an order of magnitude greater than were those of the corresponding lamps fabricated using the uncoated phosphor. Moreover, the greater the mass of the coating i.e., the greater the coating thickness, the larger was the half-life relative to that of the corresponding control lamp.

Figure 2:
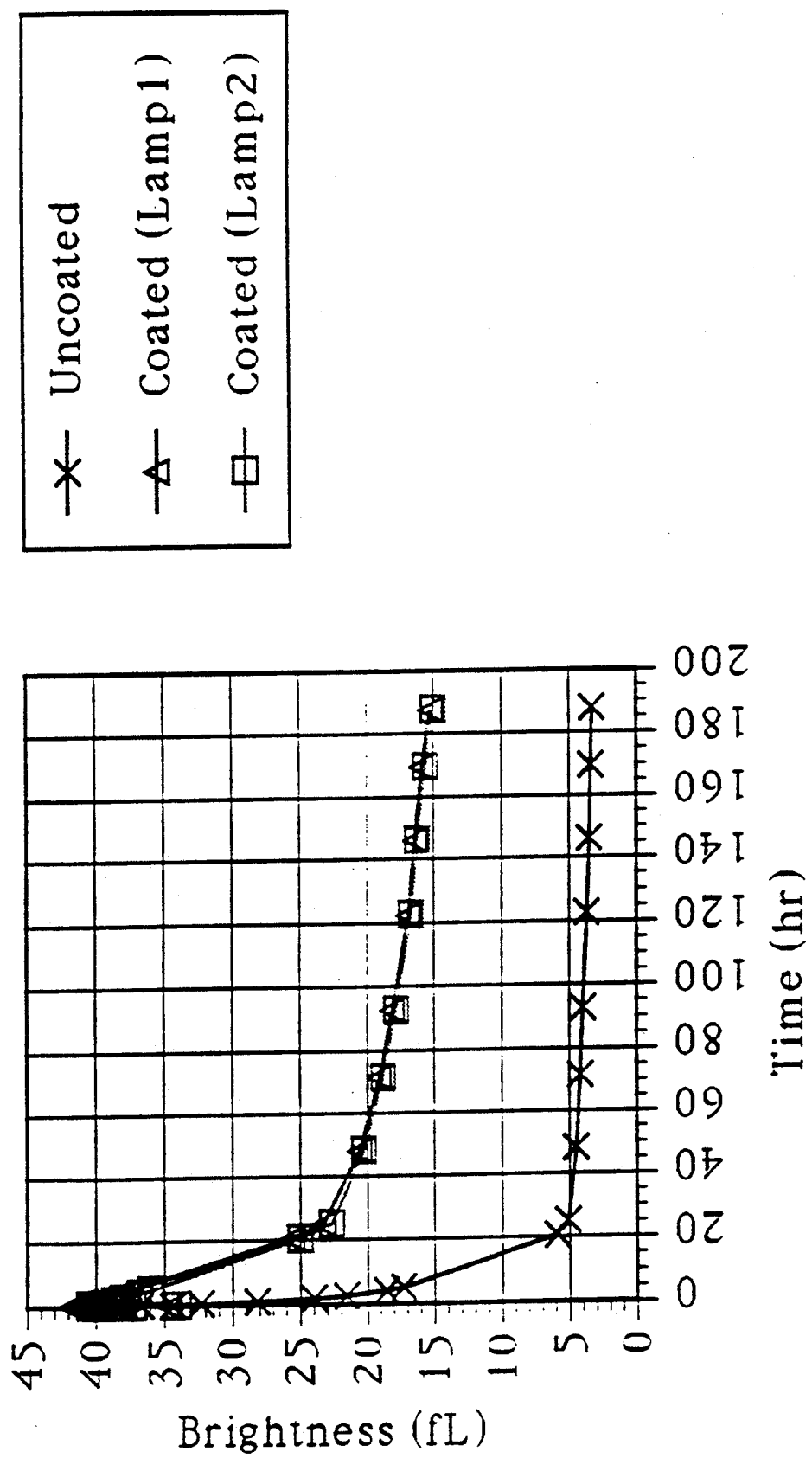
FIG. 2 shows unpackaged EL lamp data for hydrolyzed TMA coated phosphor with an aluminum content equivalent to 1.0 w/o Al(OH)$_3$ and uncoated phosphor.
Figure 3:
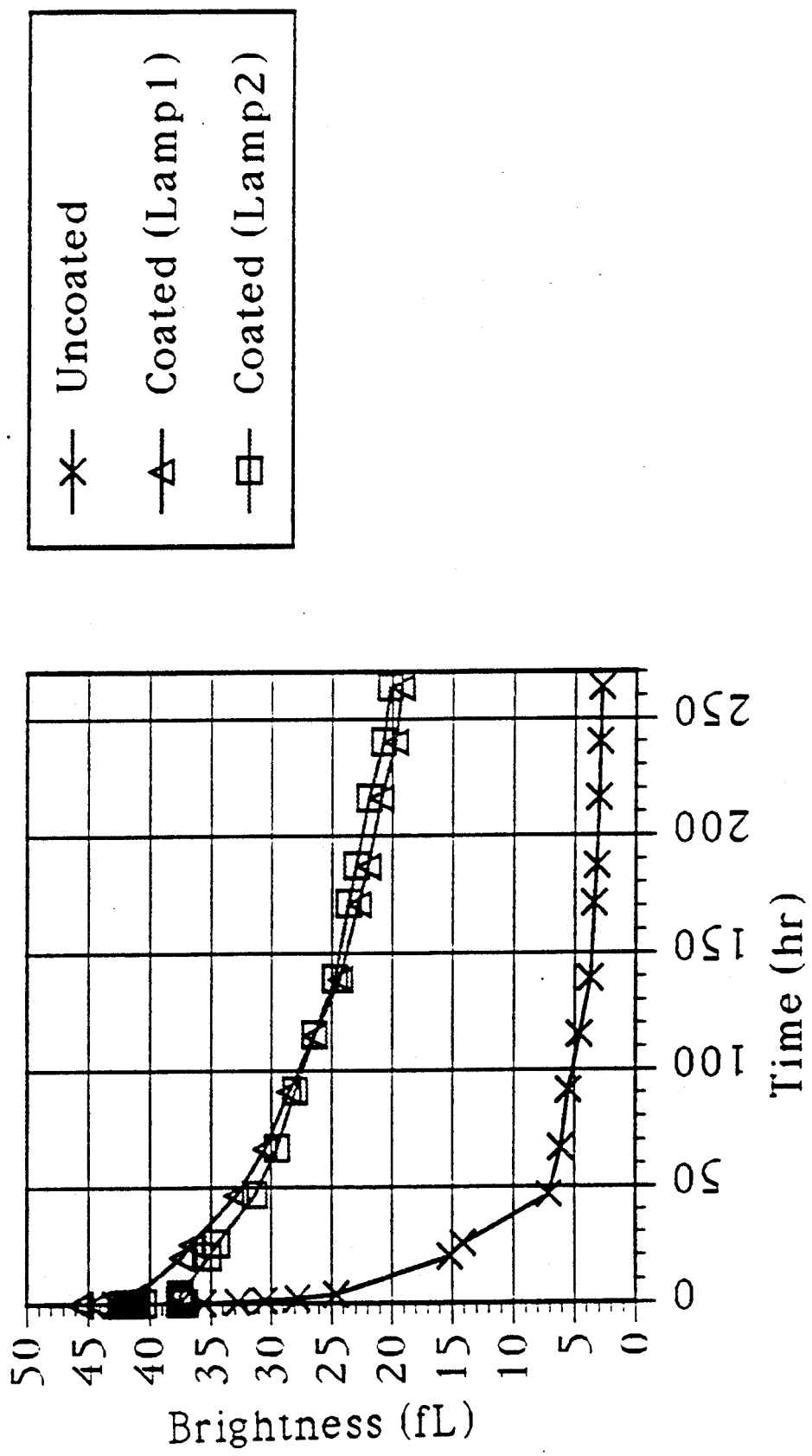
FIG. 3 shows unpackaged EL lamp data for hydrolyzed TMA coated phosphor with an aluminum content equivalent to 2.0 w/o Al(OH)$_3$ and uncoated phosphor.
Figure 4:
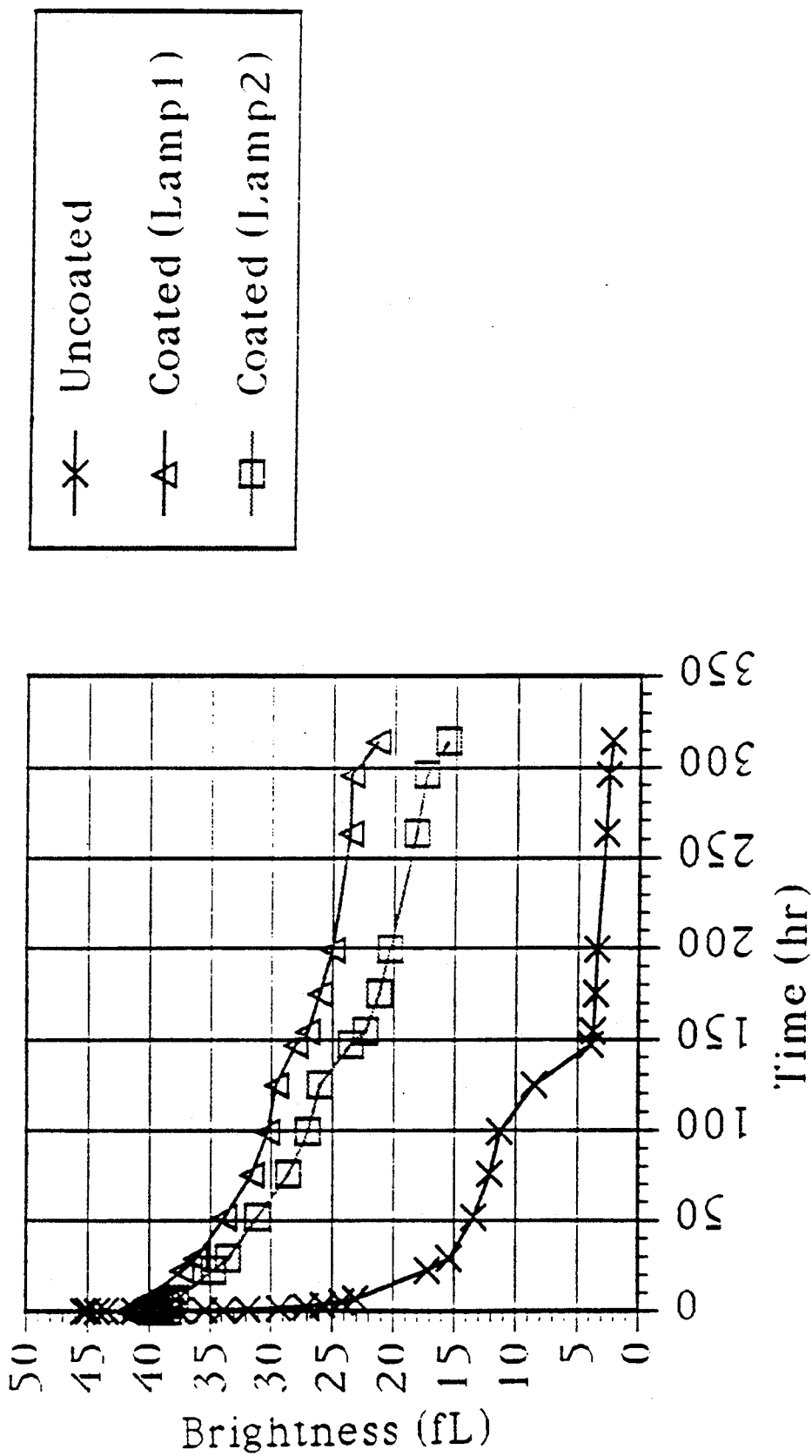
FIG. 4 shows unpackaged EL lamp data for hydrolyzed TMA coated phosphor with an aluminum content equivalent to 3.0 w/o Al(OH)$_3$ and uncoated phosphor.
Figure 5:
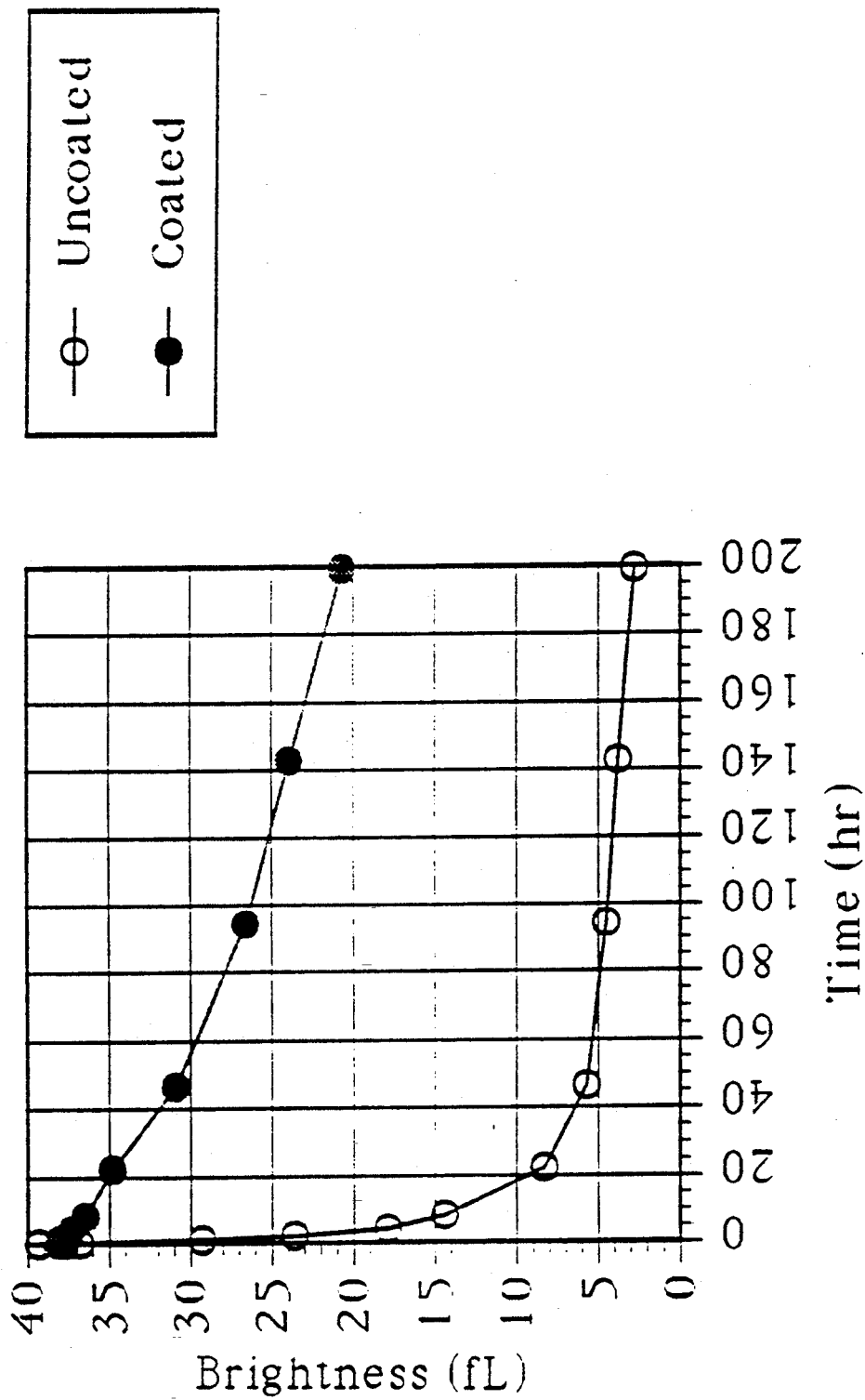
FIG. 5 shows unpackaged EL lamp data for hydrolyzed TMA coated phosphor with an aluminum content equivalent to 3.5 w/o Al(OH)$_3$ and uncoated phosphor.

The measured brightness versus time data obtained with the lamps containing coated phosphor number 320-90, along with the data obtained with the corresponding uncoated-phosphor control lamp are plotted in FIG. 2. The corresponding data obtained with the lamps fabricated from sample number 327-90 and its corresponding control lamp are similarly compared in FIG. 3. The data for sample 403-90 are likewise compared in FIG. 4. FIG. 5 shows the data for lamps fabricated using sample 416-90.

As shown in FIGS. 2-5, the initial brightnesses of the lamps are nearly identical. However, while the brightness of the lamps fabricated with the uncoated phosphor decreased to half of their initial brightness in less than four hours of operation, the lamps fabricated with the coated phosphor from 416-90 was operating above half brightness after more than 200 hours of continuous operation. The maximum brightnesses measured with the uncoated and coated-phosphor lamps, the ratio of the maximum brightnesses (coated versus uncoated) and the ratio of the half-life values obtained with the uncoated and coated phosphor-containing lamps are all listed in Table 2, along with the comparable data for samples 320-90, 327-90, and 403-90.

TABLE 2

| | Test Result Summary for Unpackaged EL Lamps Supported Upon ITO-Coated Glass | | | | |
|---|---|---|---|---|---|
| | Equivalent | Maximum Brightness (fl) | | B(coated) | t½ (coated) |
| Sample No. | w/oAl(OH)₃ | Uncoated | Coated | B(uncoated) | t½ (uncoated) |
| 320-90 | 1.01 | 40.0 | 41.2 | 1.03 | 15 |
| 327-90 | 1.89 | 42.4 | 42.4 | 1.00 | 32 |
| 403-90 | 2.96 | 45.4 | 40.8 | 0.90 | 40 |
| 416-90 | 3.53 | 39.3 | 38.2 | 0.97 | 70 |

As shown, the half-life of a coated-phosphor lamp, relative to that of an uncoated-phosphor lamp, increases with increasing coating weight i.e., with increasing coating thickness. Sample 416-90 was also examined using the XPS surface analysis technique so as to gauge the extent to which the ZnS:Cu phosphor particles are completely encapsulated by the coating. Samples 320-90, 327-90, and 403-90, as well as the uncoated phosphor (Lot 398), were similarly examined. The results of these five analyses are summarized in Table 3 (where the surface concentrations of Zn, S, Al, O, and Cu detected by the XPS technique are expressed on an atomic percent basis).

TABLE 3

| XPS Surface Analysis Results for Uncoated and Coated Type 723 ZnS:Cu EL Phosphor | | | | | |
|---|---|---|---|---|---|
| Sample | Zn | S | Al | O | Cu |
| Uncoated (Lot 398) | 33.35 | 39.13 | n.d. | 12.18 | 0.34 |
| 320-90 | 0.27 | n.d. | 42.21 | 55.95 | n.d. |
| 327-90 | 0.20 | n.d. | 40.89 | 53.22 | n.d. |
| 403-90 | n.d. | n.d. | 41.89 | 53.39 | n.d. |
| 416-90 | 0.04 | n.d. | 40.92 | 54.36 | n.d. |

As shown, no sulfur or copper was detected near the surface of any coated material. Further, only a very small amount of zinc could be detected with any of the coated materials. Thus, these materials appear to be virtually completely encapsulated in a coating composed of only two elements detectable by XPS analysis: aluminum and oxygen.

EXAMPLE 2

Using three coated phosphor materials, Sample 320-90, 327-90 and 403-90 along with the virgin (uncoated) phosphor, additional electroluminescent lamps were fabricated with sheets of flexible ITO-coated Mylar serving as the transparent support/transparent front electrode. In contrast to Example 1, these lamps were all heat-sealed between two sheets of 7.5 mil thick water-impermeable Aclar. As before, each lamp was continuously operated using a 120 V a.c. power supply driven at 400 Hz. The resulting brightness and half-life values (obtained from the recorded brightness versus time data for each lamp) are all listed in Table 4.

TABLE 4

Test Result Summary for Aclar-Packaged EL Lamps Supported Upon ITO-Coated Mylar

| Sample No. | Equivalent w/oAl(OH)$_3$ (Approx) | Maximum Brightness (fl) Uncoated | Maximum Brightness (fl) Coated | B(coated) / B(uncoated) | t$_{\frac{1}{2}}$ (coated) / t$_{\frac{1}{2}}$ (uncoated) |
|---|---|---|---|---|---|
| 320-90 | 1 | 35.2 | 31.2 | 0.89 | 2.9 |
| 327-90 | 2 | 40.8 | 41.6 | 1.02 | 2.3 |
| 403-90 | 3.0 | 38.4 | 41.2 | 1.07 | >2 |

As shown in Table 4, the maximum brightnesses measured with the lamps containing the three coated materials were all within approximately 10% of those measured with the corresponding uncoated-phosphor control lamps. Further, the thicker the coating, the brighter the coated phosphor-containing lamps relative to the uncoated-phosphor control lamp. Most surprisingly, despite the fact that all of the lamps were well sealed between sheets of the water-impermeable polymeric packaging material, the half-lives of the lamps containing the coated phosphors were all at least twice that of the corresponding uncoated-phosphor control lamp.

Figure 6:
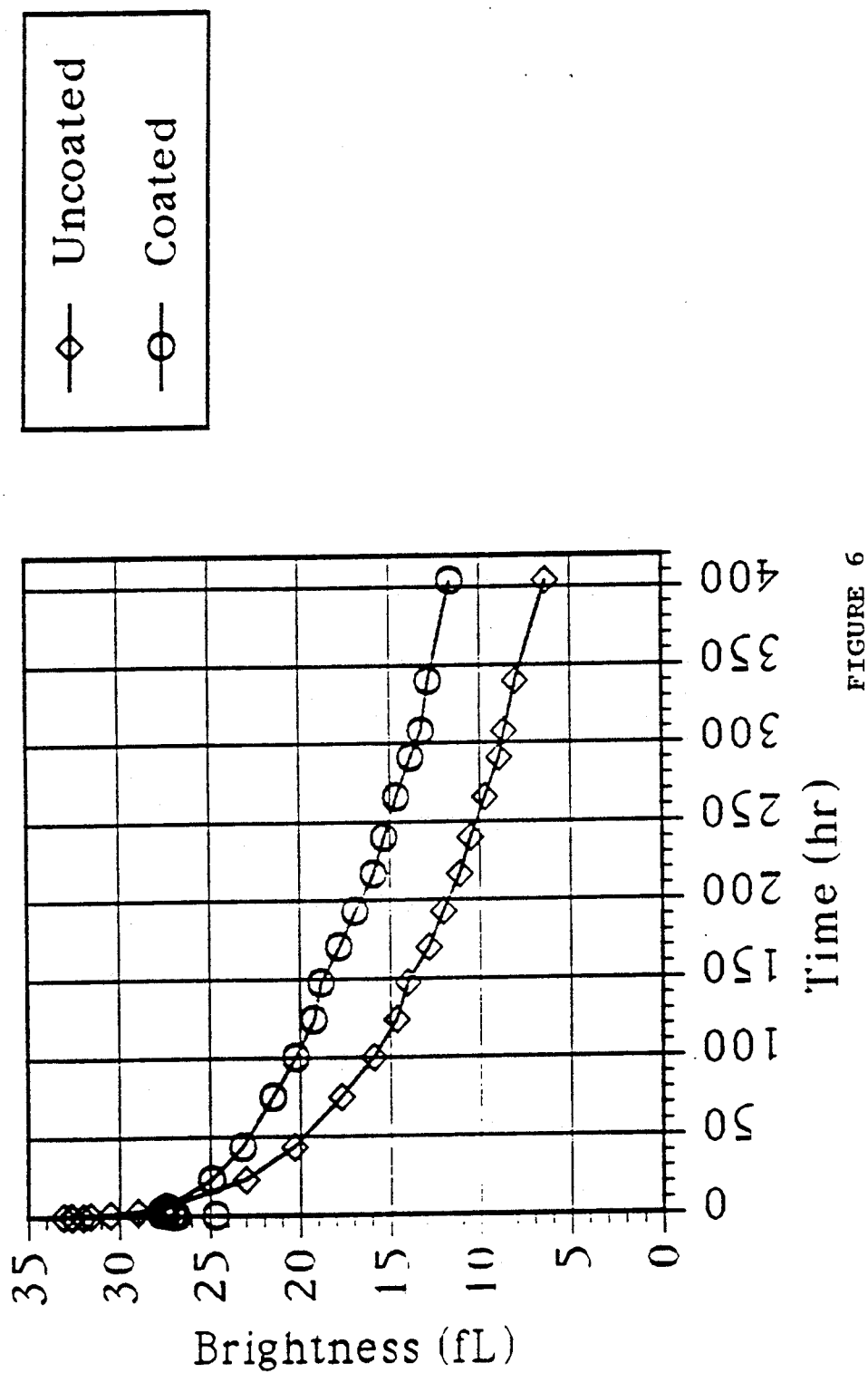
FIG. 6 shows packaged EL lamp data for hydrolyzed TMA coated phosphor with an aluminum content equivalent to 1.0 w/o Al(OH)$_3$ and uncoated phosphor.
Figure 7:
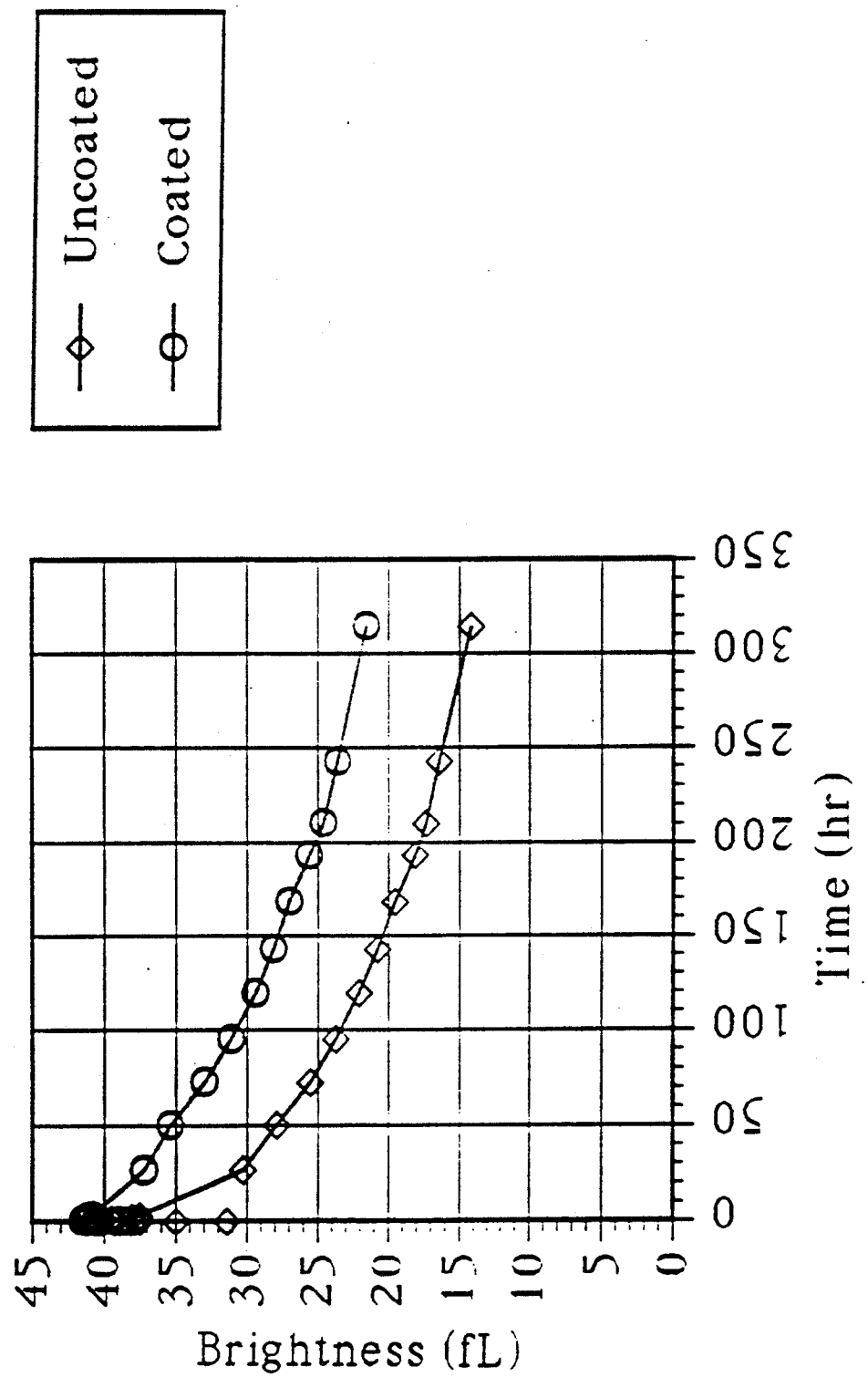
FIG. 7 shows packaged EL lamp data for hydrolyzed TMA coated phosphor with an aluminum content equivalent to 2.0 w/o Al(OH)$_3$ and uncoated phosphor.
Figure 8:
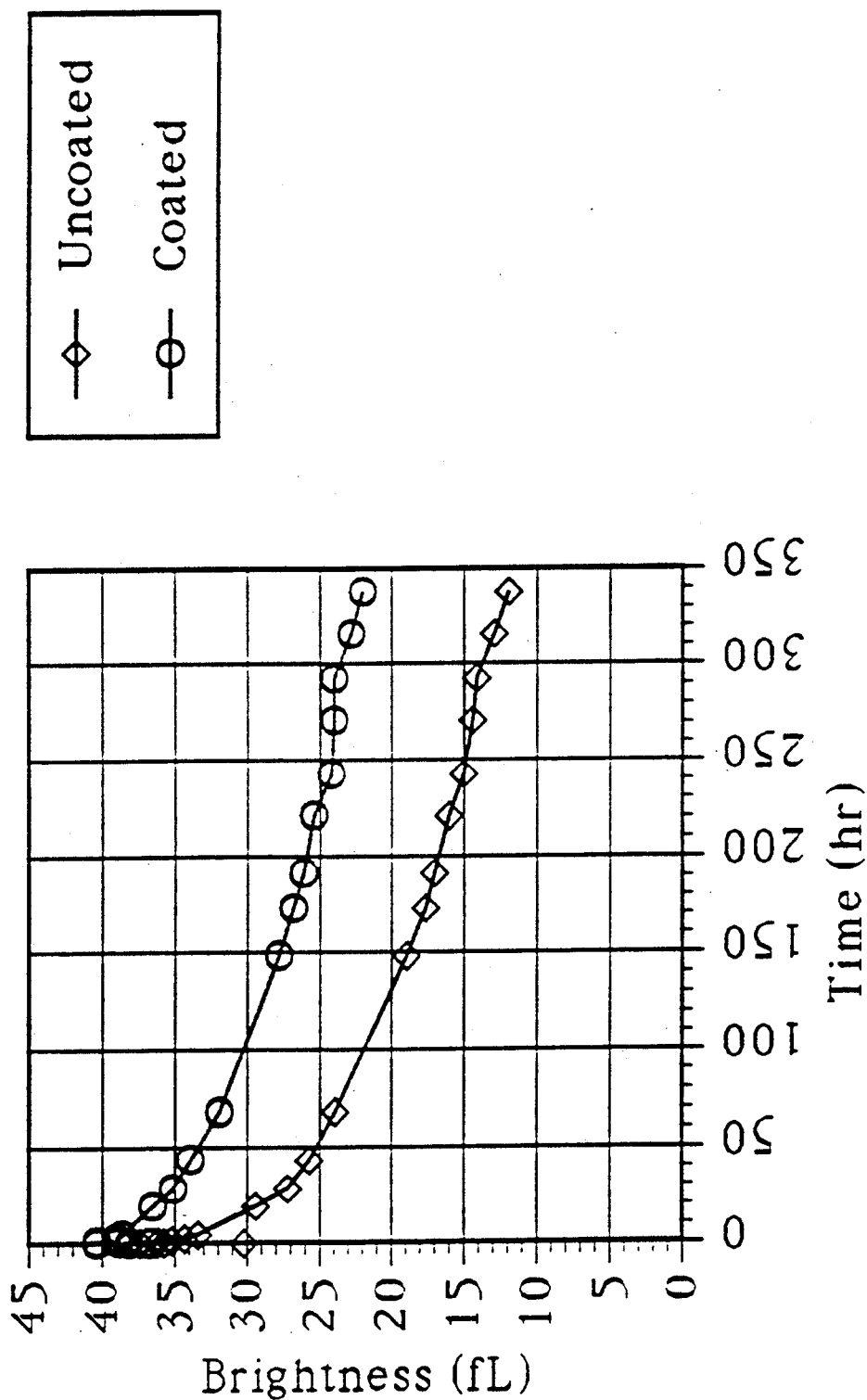
FIG. 8 shows packaged EL lamp data for hydrolyzed TMA coated phosphor with an aluminum content equivalent to 3.0 w/o Al(OH)$_3$ and uncoated phosphor.

The averaged brightness versus time data obtained with the lamps containing coated phosphor number 320-90, along with the data obtained with the corresponding uncoated-phosphor control lamp, are plotted in FIG. 6. The corresponding data obtained with the lamps fabricated from sample number 327-90 and its corresponding control lamp are similarly compared in FIG. 7. The data for sample 403-90 are likewise compared in FIG. 8. In each case, the packaged coated phosphor-containing lamps ran considerably brighter than did the corresponding lamp containing the standard uncoated phosphor. Moreover, the longer the lamps were burned, the greater the relative difference between the brightnesses of the lamps containing the coated and uncoated phosphors. This trend is particularly noteworthy in the case of the lamps fabricated from sample 403-90 (FIG. 8). In this case the coated phosphor-containing lamps yielded brightnesses 50% greater than those obtained with the uncoated phosphor after only about 150 hours of continuous operation. These same lamps were about 75% brighter than the control lamp after burning for about 300 hours.

EXAMPLE 3

In addition to the Aclar-packaged flexible lamps fabricated using the uncoated phosphor and coated phosphor materials described in Example 2, completely unpackaged i.e., unprotected, lamps were fabricated using the uncoated phosphor and coated phosphor number 403-90. These unpackaged lamps were burned alongside and at the same time as were the corresponding Aclar-packaged lamps containing the uncoated and coated phosphor. The average brightness versus time data obtained with the packaged and unpackaged lamps fabricated from coated phosphor number 403-90 are compared in FIG. 9. The corresponding brightness versus time data obtained with the packaged and unpackaged lamps fabricated from the standard, uncoated phosphor are similarly compared in FIG. 10.

Figure 9:
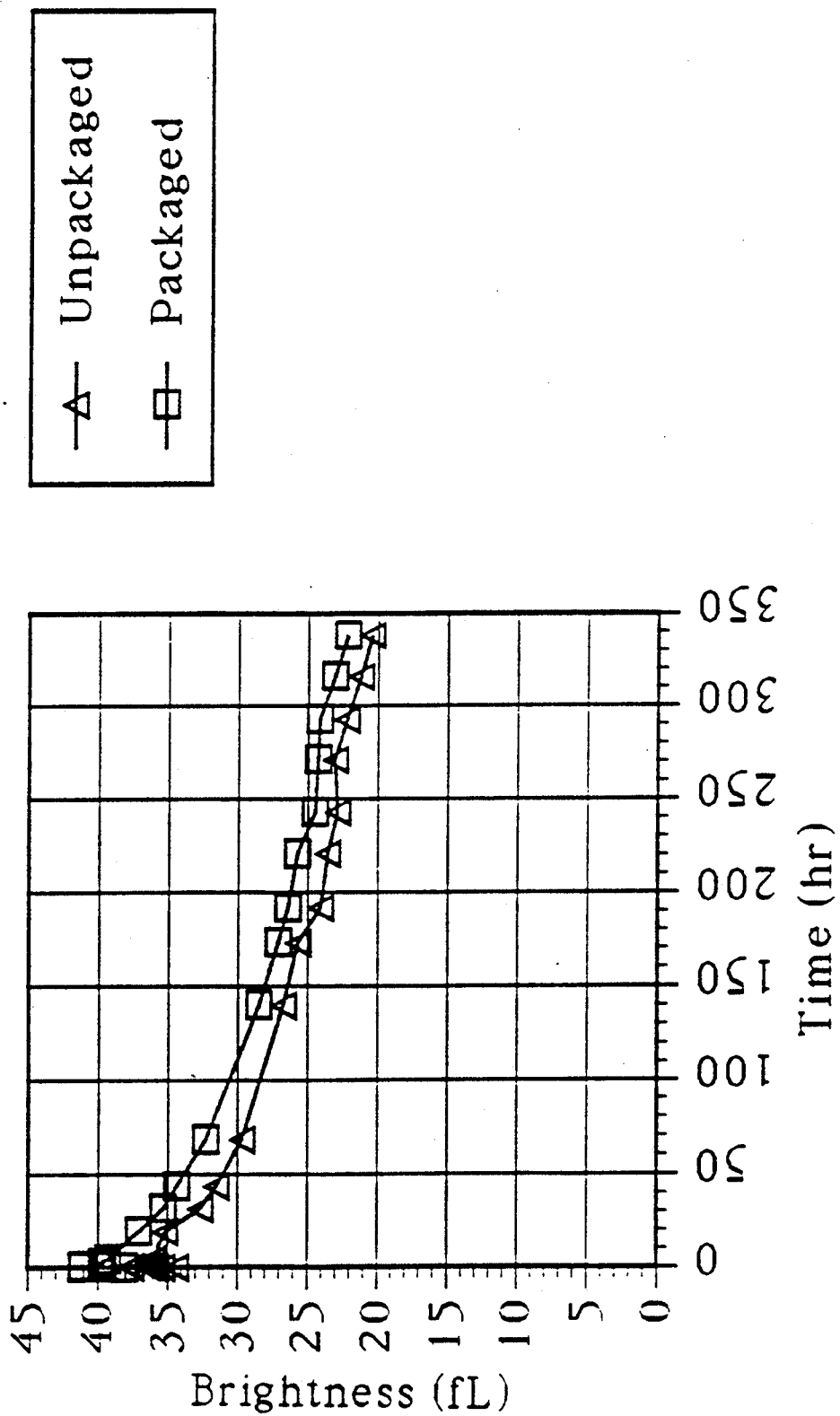
FIG. 9 shows packaged versus unpackaged EL lamp data for hydrolyzed TMA coated phosphor with an aluminum content equivalent to 3.0 w/o Al(OH)$_3$.
Figure 10:
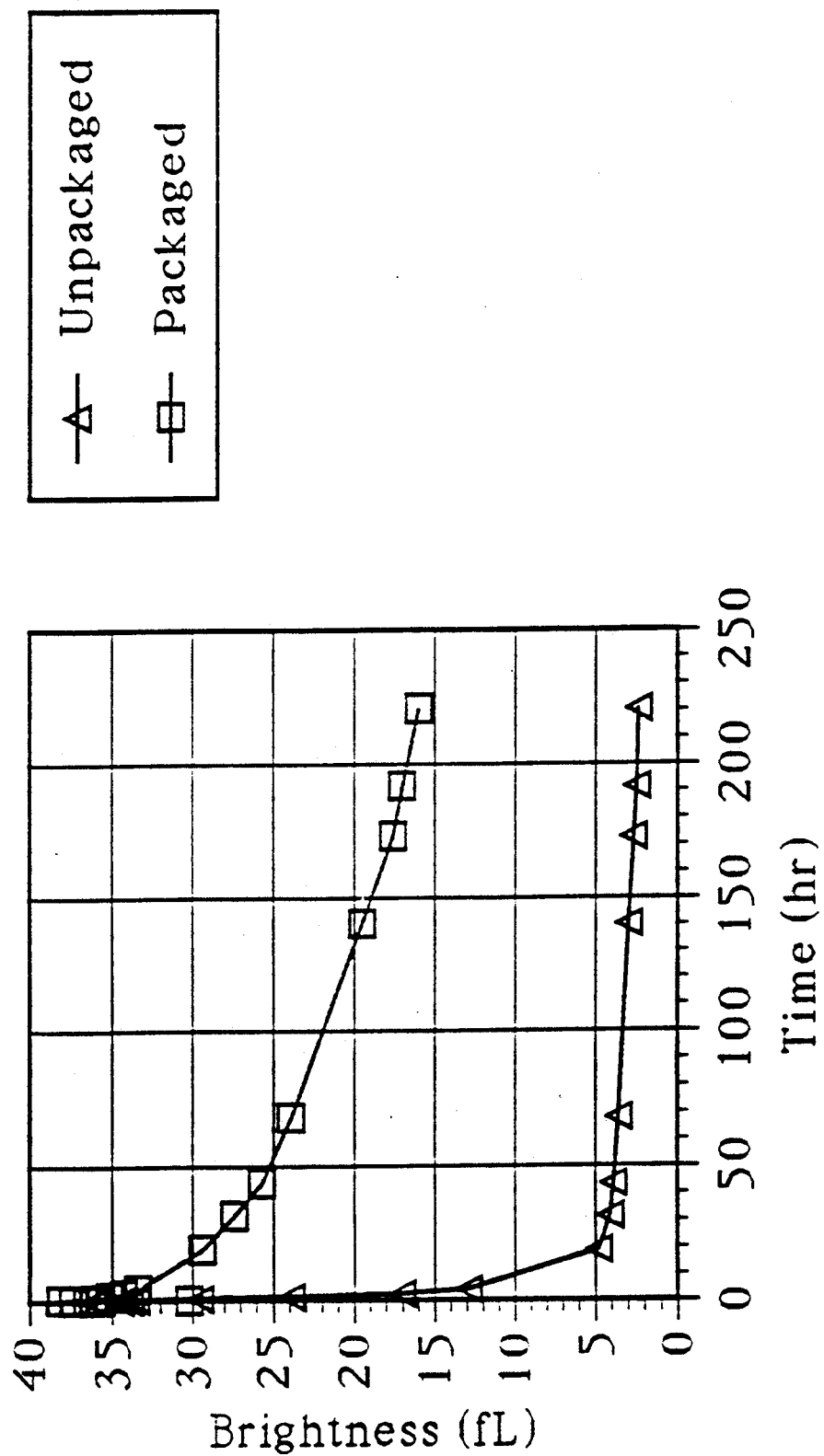
FIG. 10 shows packaged versus unpackaged EL lamp data for uncoated phosphor.
Figure 11:
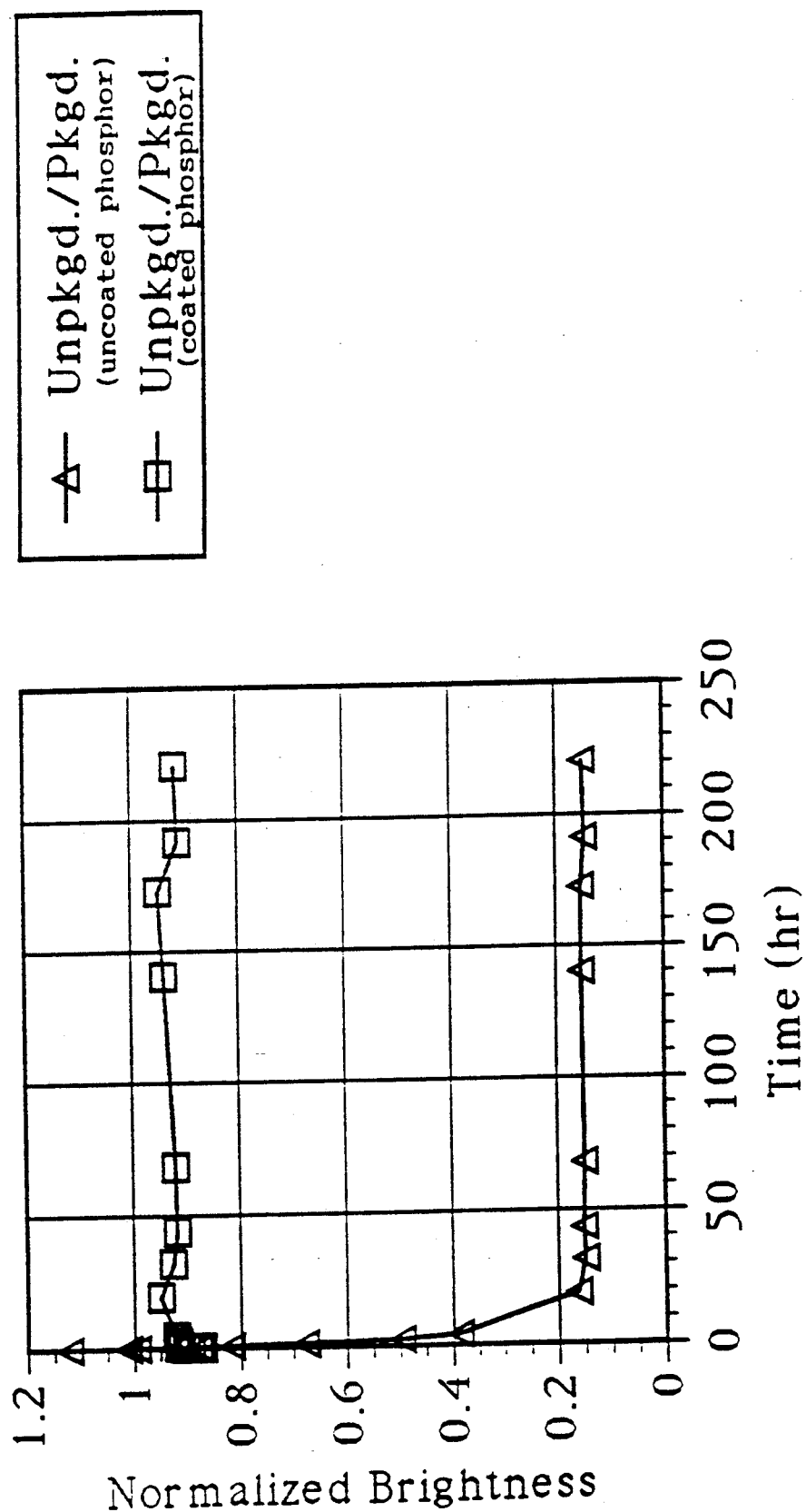
FIG. 11 shows plastic lamp unpackaged to packaged brightness ratios for hydrolyzed TMA coated phosphor with an aluminum content equivalent to 3 w/o Al(OH)$_3$ and uncoated phosphor.

As shown in FIG. 9, the completely unprotected lamps containing the coated phosphor yielded brightnesses that were always within 10% of those obtained with the Aclar-packaged lamps. In contrast, the brightnesses obtained with the unpackaged lamps fabricated from the uncoated phosphor decreased rapidly with time. As a result, the unpackaged uncoated phosphor-containing lamp brightnesses were, on average, only about 15% of those obtained with the Aclar-packaged lamp containing the same uncoated phosphor. These results are illustrated in FIG. 11 in which the unpackaged-to-packaged lamp brightness ratios obtained with both the uncoated and coated phosphors are compared.

Thus, whereas the severe moisture sensitivity of the uncoated phosphor completely prevents its use in unpackaged electroluminescent lamps, the application of the hydrolyzed TMA coatings formed via the fluidized bed CVD process outlined in this invention render the phosphor practically moisture insensitive. As a result, at least for some EL lamp applications, it appears that it may be possible to completely eliminate the costly water-impermeable polymeric packaging materials that are absolutely necessary in all EL lamps marketed today. On the other hand, the use of highly moisture-insensitive ZnS phosphors prepared according to the present invention used in conjunction with such water-impermeable packaging materials perhaps also including thin layers of special desiccating substances to further prevent moisture from reaching the luminescent material, would result in EL lamps with lifetimes exceeding those of any similar device produced today.

EXAMPLE 4

Electroluminescent lamps were fabricated upon sheets of ITO-coated polyester (Sierracin Intrex-100) and subsequently heat-sealed between two sheets of either a relatively water-impermeable plastic (Aclar, a product of Allied Signal Corp.) or a relatively water-permeable polyester material (obtained from General Binding Corp.). Identical lamps were fabricated using the as-received phosphor and the phosphor coated following the reaction conditions outlined above in Table 1, Sample No. 508-90. The lamps were all evaluated using a 120 VAC power supply operated at 400 Hz. The relative humidity in the test environment was maintained in the 50-60% range, and the ambient temperature ranged between 20° and 23° C. Lamp brightness was measured as a function of time using a calibrated optometer.

Figure 12:
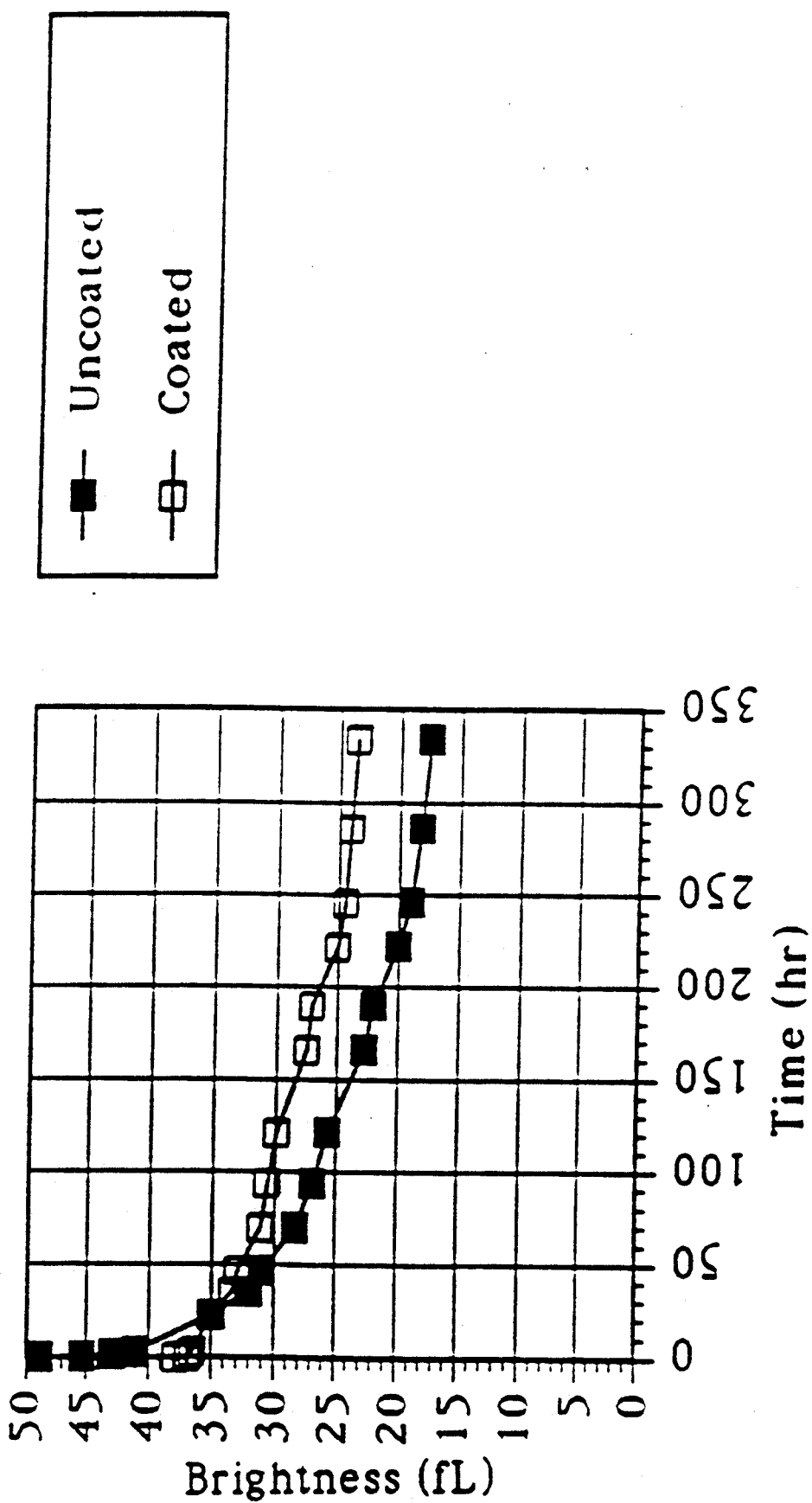
FIG. 12 shows Aclar packaged EL lamp data for hydrolyzed TMA coated phosphor with an aluminum content equivalent to 6.1 w/o Al(OH)$_3$ and uncoated phosphor.

The brightness versus time data obtained with the lamps fabricated with the uncoated and coated phosphor (508-90) packaged in Aclar are compared in FIG. 12. Whereas the initial brightness of the lamp containing the coated phosphor was somewhat lower than that of the lamp containing the uncoated phosphor, equal brightnesses were measured after about 24 hours of operation. Thereafter, the brightness of the lamp containing the coated phosphor exceeded that of the lamp containing the uncoated phosphor, the difference in brightness increasing with time of operation.

Figure 13:
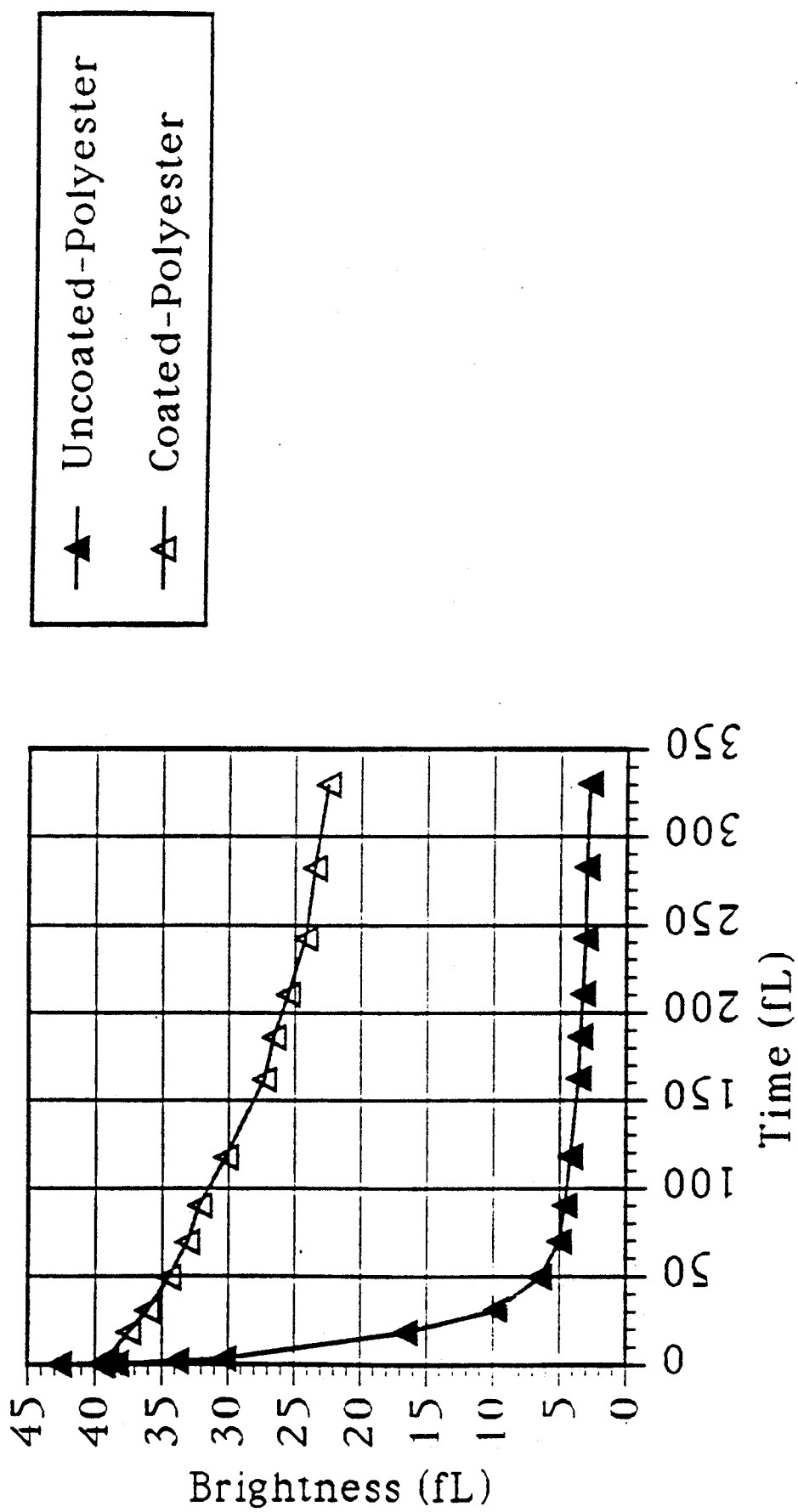
FIG. 13 shows polyester packaged EL lamp data for hydrolyzed TMA coated phosphor with an aluminum content equivalent to 6.1 w/o Al(OH)$_3$ and uncoated phosphor.

The comparable brightness versus time data obtained with the lamps fabricated with the uncoated and coated phosphor (508-90) packaged between sheets of the polyester material are similarly compared in FIG. 13. Whereas the brightness of the coated phosphor lamp decreases very gradually over hundreds of hours of operation, the brightness of the uncoated phosphor lamp decreases very rapidly, dropping to about 25% of its initial value within the first 24 hours of operation.

Figure 14:
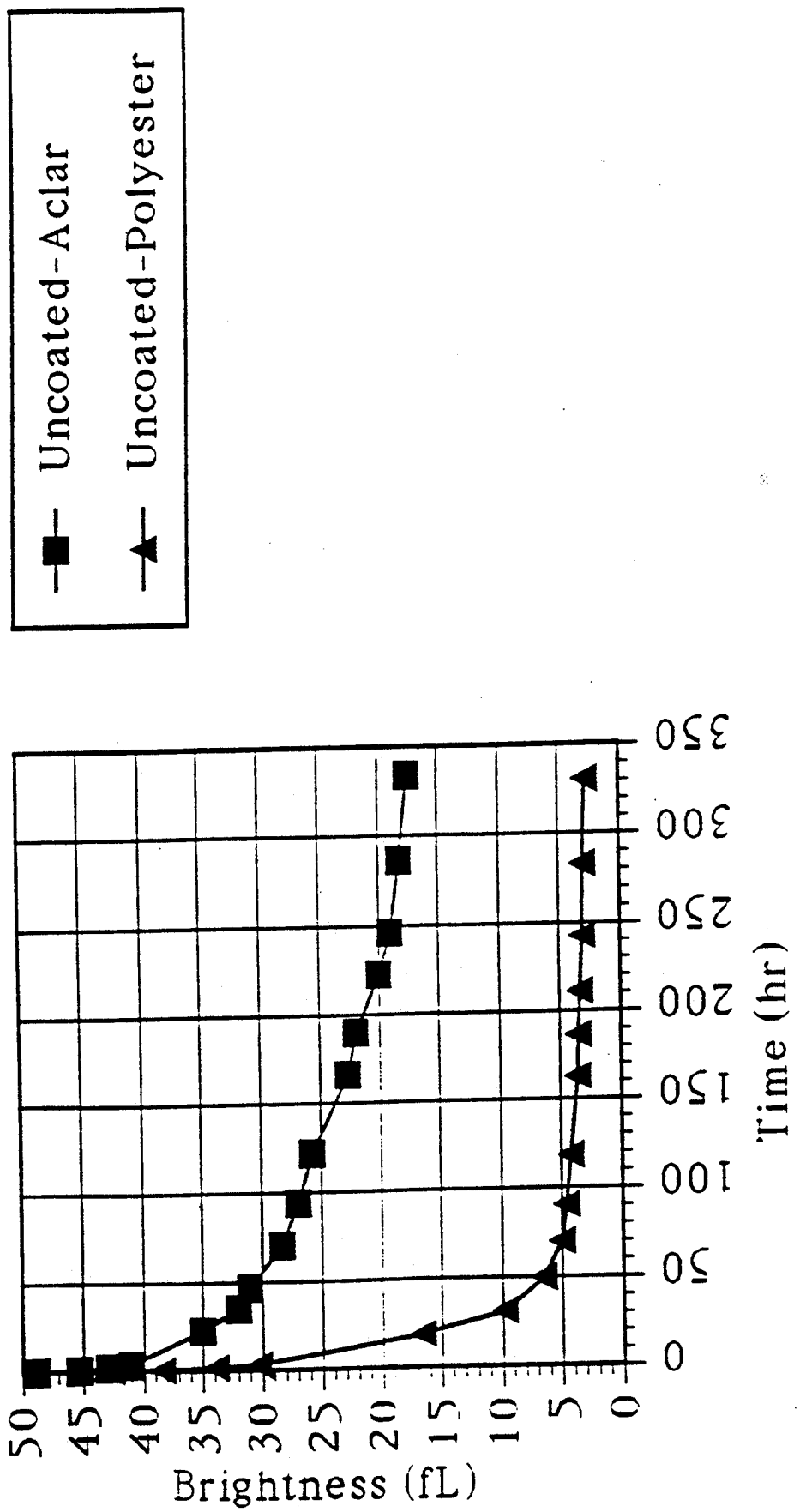
FIG. 14 compares polyester packaged and Aclar packaged EL lamps using uncoated phosphor.
Figure 15:
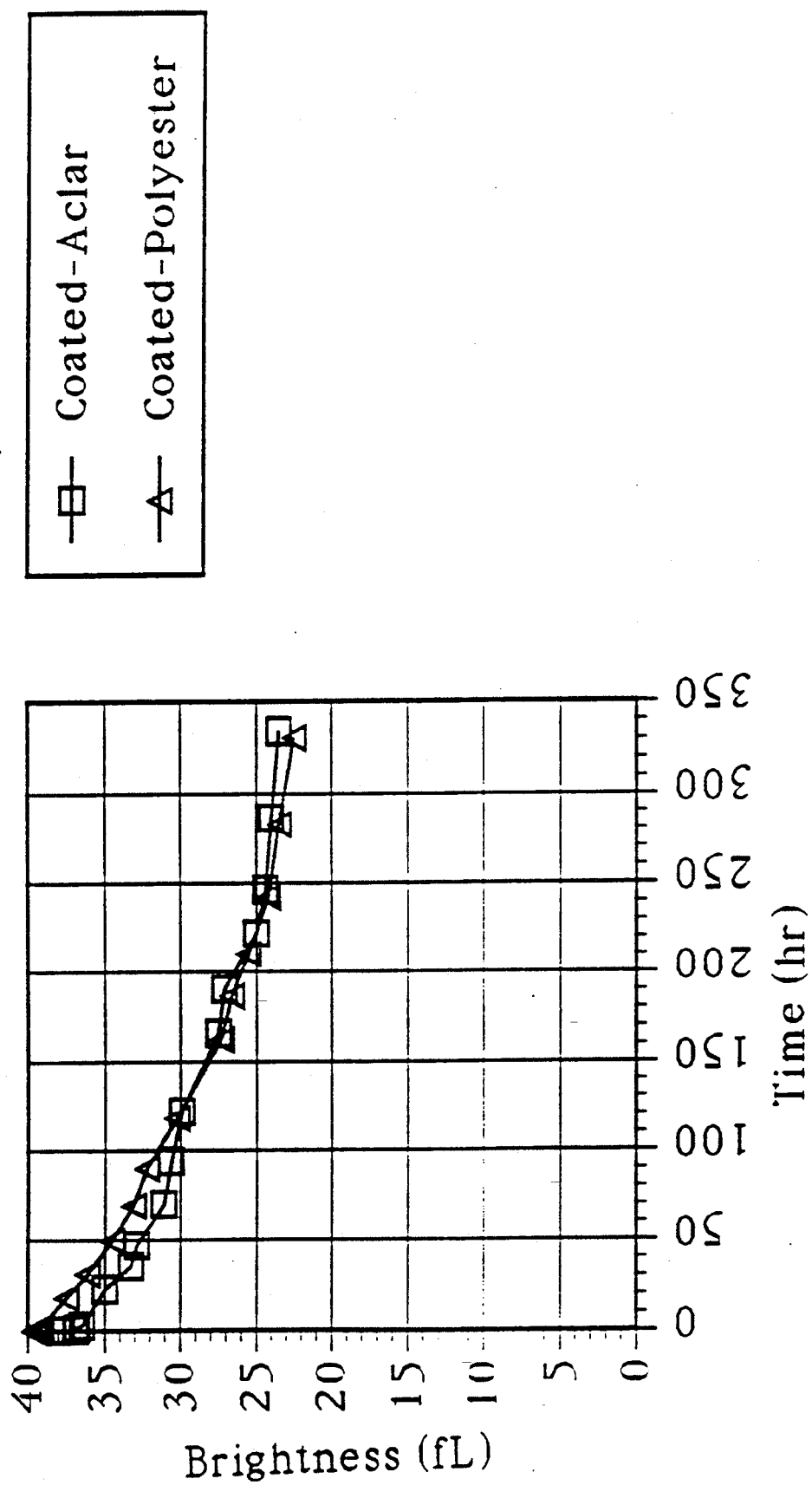
FIG. 15 compares polyester packaged and Aclar packaged EL lamps using hydrolyzed TMA coated phosphor with an aluminum content equivalent to 6.1 w/o Al(OH)$_3$.

The brightness versus time data obtained with the uncoated-phosphor lamps packaged in Aclar and in the water-permeable polyester material are compared in FIG. 14. The brightness versus time data obtained with the coated-phosphor (508-90) lamps packaged in Aclar and in the polyester material are similarly compared in FIG. 15. Whereas the coated phosphor performs equally well in either packaging material, the standard uncoated phosphor exhibits acceptable performance only in an essentially hermetically packaged lamp using a packaging material having an extremely low water permeability.

EXAMPLE 5

This example compares the performance of two different lots of coated phosphor in identically constructed electro-luminescent lamps. Two different lots of Type 723 ZnS:Cu phosphor (lots 361S and 398S) were employed. As in Example 4, these two phosphor lots were coated using the conditions outlined in Table 1. The coated phosphors were assigned sample numbers 514-90 and 521-90, respectively. The EL lamps were fabricated upon sheets of the same ITO-coated polyester material. Lamps containing each of the two coated-phosphor lots were packaged between sheets of water-impermeable Aclar and between sheets of a relatively water-permeable polyester material. As in previous Examples, the lamps were all tested using a 120 VAC/400 Hz power supply, the lamp brightness being recorded as a function of operating time.

Figure 16:
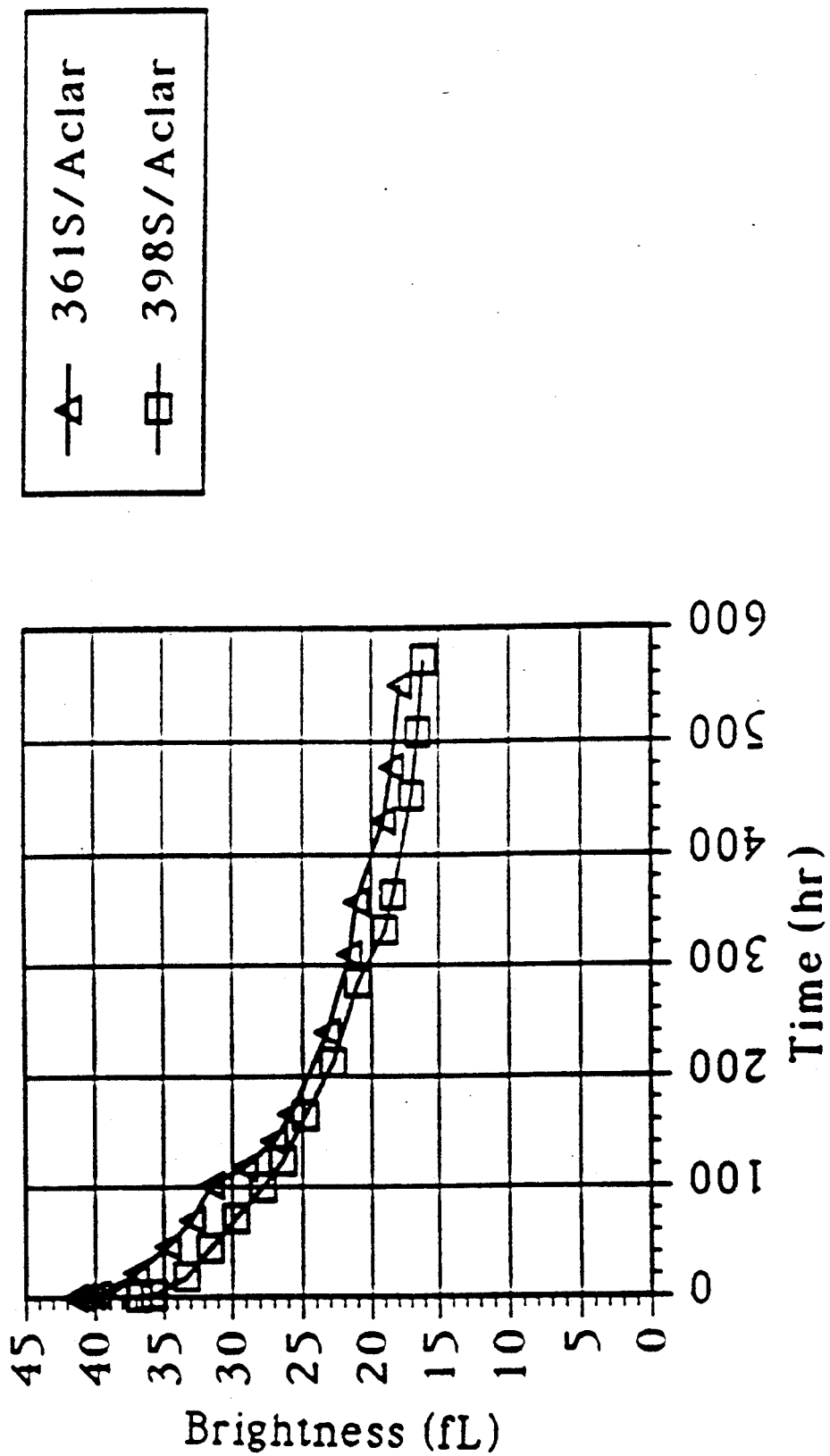
FIG. 16 compares EL lamp data for plastic lamps packaged in Aclar using different lots of phosphor coated with hydrolyzed TMA.
Figure 17:
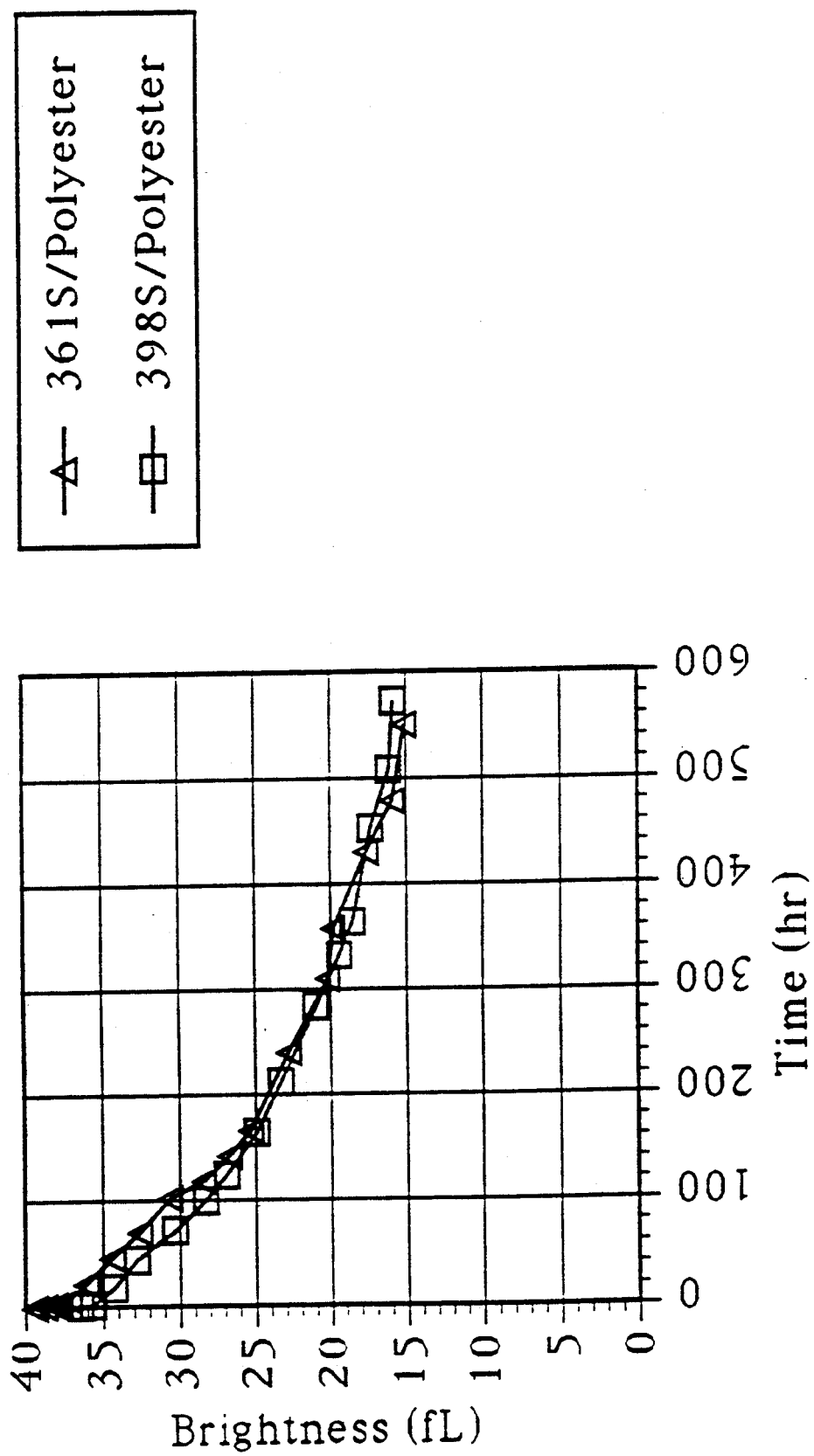
FIG. 17 compares EL lamp data for plastic lamps packaged in polyester using different lots of phosphor.

The brightness versus time data obtained with the two coated phosphors in Aclar-packaged lamps are compared in FIG. 16. The data obtained with the two coated phosphors packaged in polyester are likewise compared in FIG. 17. As shown, very similar lamp performance was measured with the two coated phosphors, independent of whether water-permeable or water-impermeable packaging was used. Thus, these data demonstrate both the moisture insensitivity of the coated phosphor and the reproducibility of the phosphor coating process itself.

EXAMPLE 6

A quantity of Type 723 ZnS:Cu phosphor (Lot RB361S) was fractionated by means of a 325 mesh sieve. The small-particle fraction was then coated, again following the coating conditions outlined in Table 1 for Samples 508-90, 521-90 and 514-90. EL lamps were fabricated using the large-particle (>325 mesh) uncoated phosphor, the small-particle (<325 mesh) uncoated phosphor, and the coated small-particle phosphors (612-90). Lamps containing each of the three phosphors were packaged in water-impermeable Aclar and in a water-permeable polyester material. All of the lamps were operated using a 120 VAC/400 Hz power supply.

Figure 18:
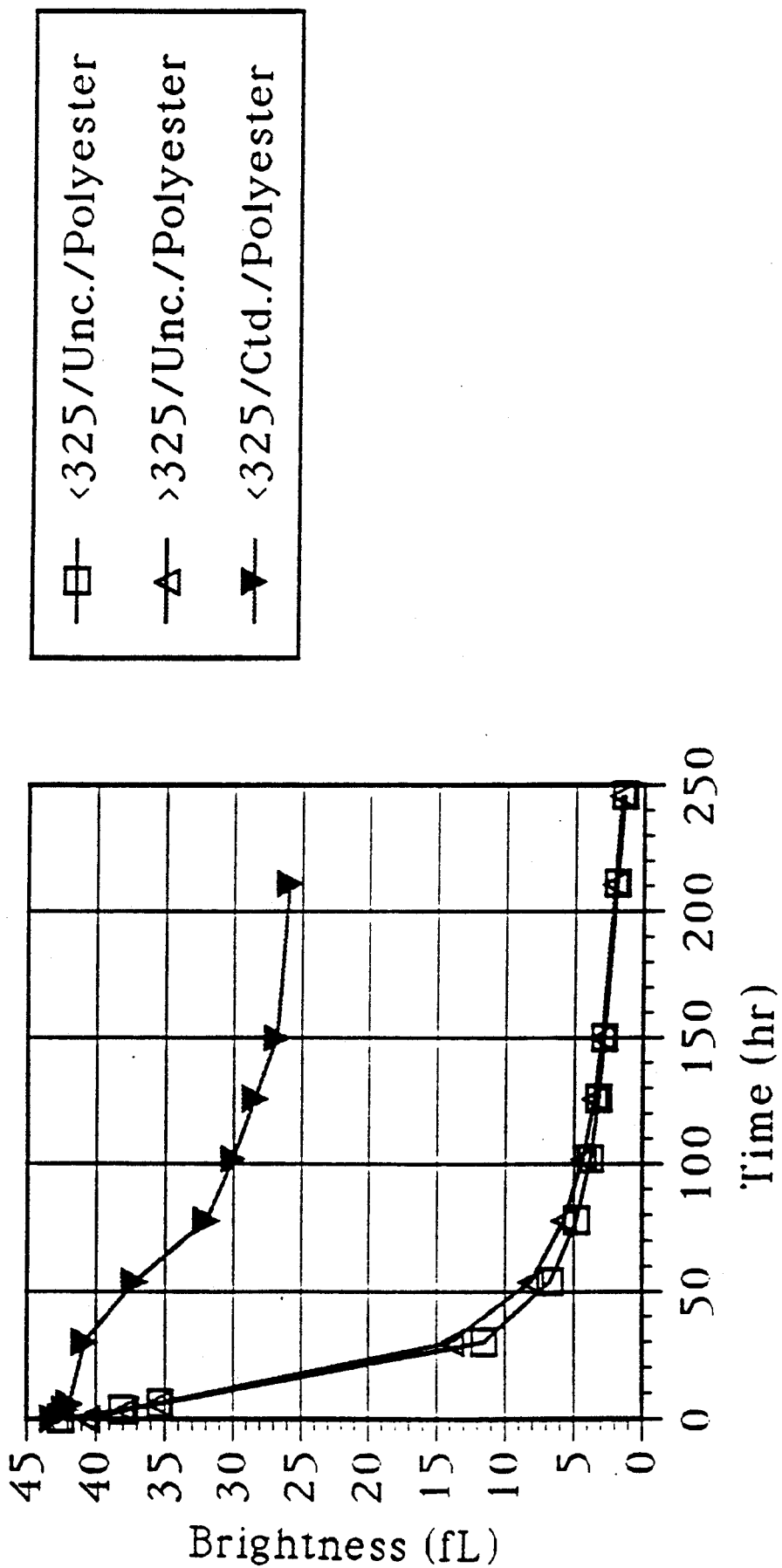
FIG. 18 compares EL lamp data for plastic lamps packaged in polyester using uncoated phosphor of greater than 325 mesh, uncoated phosphor of less than 325 mesh and hydrolyzed TMA coated phosphor of less than 325 mesh.

The brightness versus time data recorded with the lamps packaged in the water-permeable material are compared in FIG. 18. Whereas all three lamps had nearly identical initial brightnesses, the lamps containing the large-particle and small-particle uncoated phosphor suffered very rapid brightness reductions due to the extreme moisture sensitivity of the uncoated ZnS-based phosphor. In contrast, the lamp containing the coated small-particle phosphor exhibited only a very gradual brightness loss during the 200 hour measurement period, demonstrating the relative moisture insensitivity of the coated phosphor.

Figure 19:
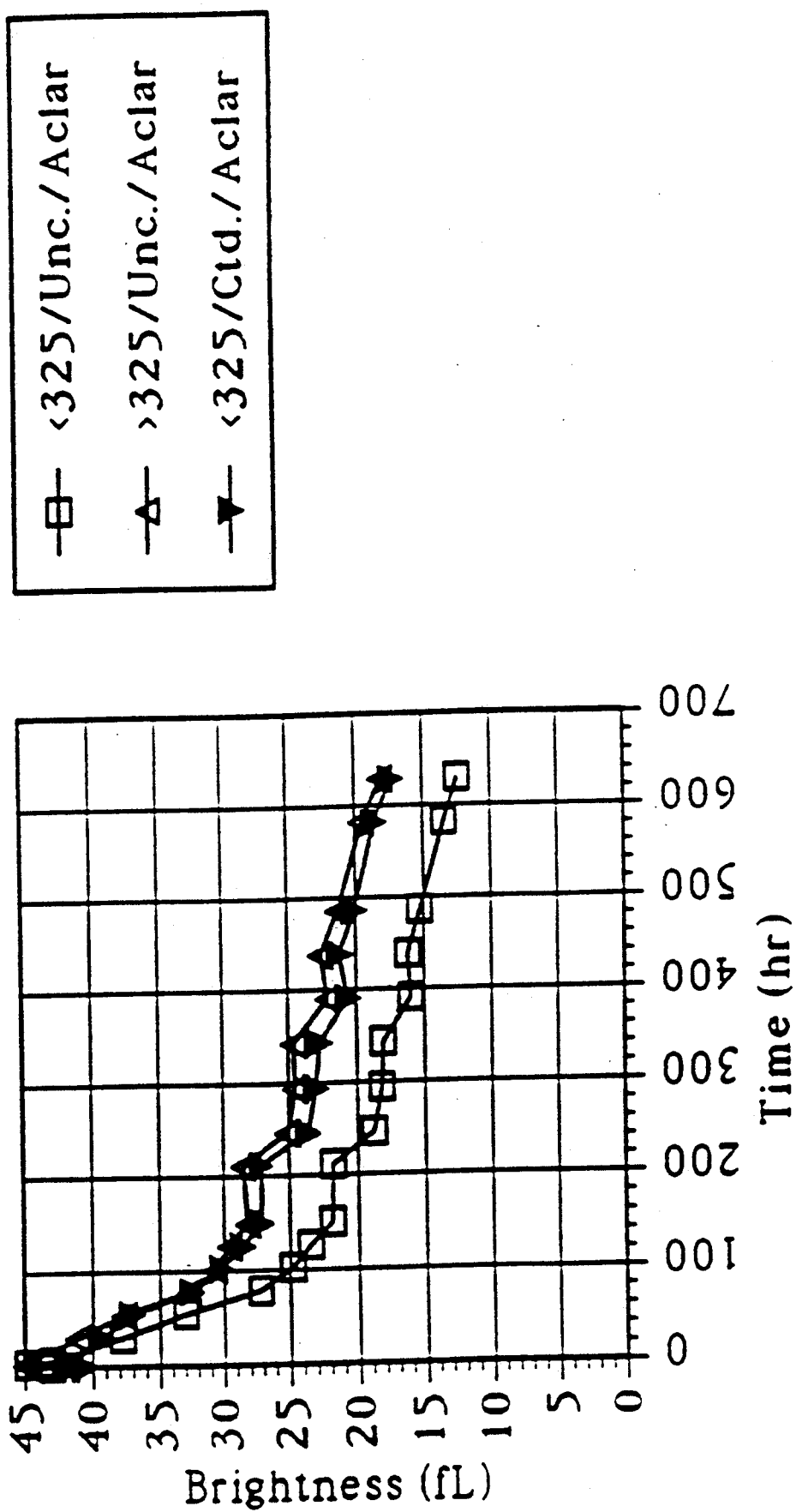
FIG. 19 compares EL lamp data for plastic lamps packaged in Aclar using uncoated phosphor of greater than 325 mesh, uncoated phosphor of less than 325 mesh and hydrolyzed TMA coated phosphor of less than 325 mesh.

The brightness versus time performance data obtained with the lamps packaged in the water-impermeable material are similarly compared in FIG. 19. In contrast to the polyester-packaged lamp data, all of the lamps exhibited relatively gradual reductions in brightness over the 600 hour measurement period. However, the brightness of the lamp containing the uncoated small-particle phosphor decreased more rapidly than did that of either the lamp containing the uncoated large-particle phosphor or that containing the coated small-particle material. The poorer maintenance of the lamp containing the uncoated small-particle phosphor is consistent with earlier observations concerning the relationships between phosphor particle size and lamp performance. However, the fact that the coated small-particle phosphor exhibits a maintenance curve nearly identical to that of the uncoated large-particle phosphor is not anticipated by earlier results.

In general, the smaller the average particle size of the phosphor, the more uniform is the appearance of the electro-luminescent lamp (by virtue of the greater particle density and improved thickness uniformity of the layer of phosphor particles which constitutes the basic lamp element). Thus, these data show that, by the use of coated small-particle ZnS-based phosphors produced via the particle-coating process described herein, an EL lamp manufacturer will be able to fabricate lamps of improved definition and uniformity with performance characteristics comparable to those typically obtained using the standard, larger-particle uncoated phosphor.

The phosphor used in Examples 1–6 cited was copper activated zinc sulfide EL phosphor. This phosphor was specifically developed for use in alternating current (A.C.) electroluminescent devices such as those described in the Examples. It is probable that all sulfide based EL phosphors suitable for use in A.C. EL devices may be made moisture insensitive by application a hydrolyzed trimethyl aluminum coating. It is also considered likely that sulfide-based EL phosphors developed for use in direct current electroluminescent devices may be rendered moisture insensitive by the application of the coatings described in the present invention. The following examples demonstrate the applicability of the process to other EL phosphors.

Examples 7, 8 and 9 described below demonstrate the effectiveness of the coating process on three additional ZnS-based electroluminescent materials currently available from Sylvania. Example 10 demonstrates a different kind of moisture insensitivity and Example 11 attempts to further characterize the hydrolyzed TMA coatings. The coating reaction conditions for Examples 7–11 are listed below.

Phosphor Coating Conditions

Phosphor Weight: 300 gm

Carrier Gas: Purified $N_2$

Water Bubbler Temp./$N_2$ Flow Rate: 70° C./1.0 l/min.

TMA Bubbler Temp./$N_2$ Flow Rate: 30° C./0.5 l min.

Coating Time/Temp.: 5 ½ hr./200° C.

EXAMPLE 7

Electroluminescent lamps were fabricated upon sheets of ITO-coated polyester and subsequently heat-sealed between two sheets of a relatively water-permeable polyester material (obtained from General Binding Corp.) The electro-luminescent phosphor used was Sylvania Type 523 (Lot ELB357), a ZnS-based material co-doped with both copper and manganese. Identical lamps were fabricated using the as-received phosphor and the phosphor coated following the reaction conditions outlined above (Sample No. 80390 with a 6.51% equivalent $Al(OH)_3$ loading). The lamps were evaluated using a 120 VAC power supply operated at 400 Hz. The relative humidity in the test environment ranged between 50 and 60%, and the ambient temperature ranged between 21 and 24° C. Lamp brightnesses were measured as a function of time using a calibrated optometer.

Figure 20:
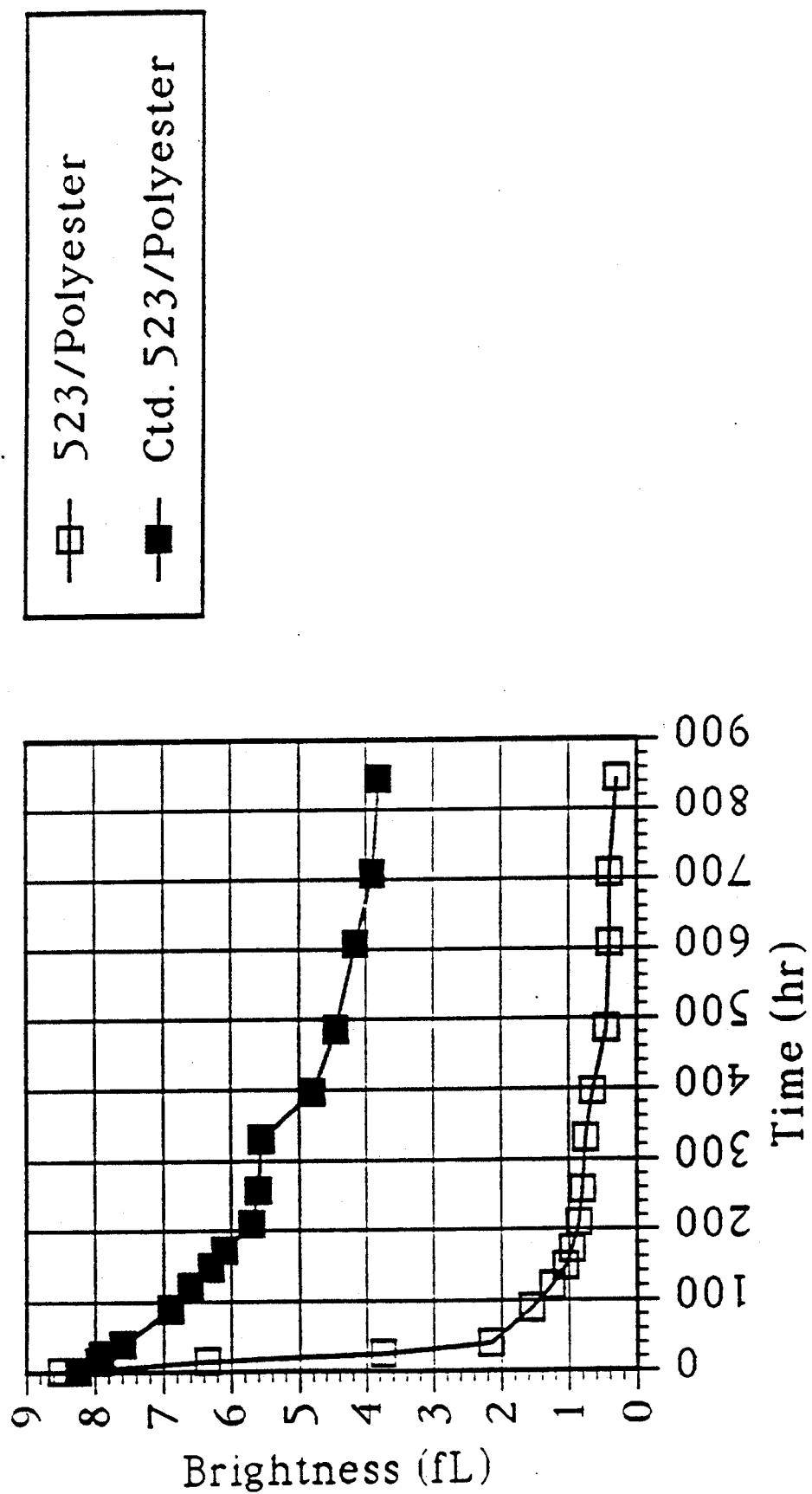
FIG. 20 compares EL lamp data for polyester packaged hydrolyzed TMA coated phosphor with an aluminum content equivalent to 6.51% Al(OH)$_3$ and uncoated phosphor.

The brightness versus time data obtained with the lamps fabricated with the uncoated and coated phosphor are compared in FIG. 20. As shown, a somewhat higher initial brightness was measured with the lamp containing the uncoated phosphor. However, after several hours of operation, the brightness of the lamp containing the coated phosphor exceeded that of the lamp containing the uncoated phosphor, the difference in brightness increasing with time of operation. These data demonstrate the relative moisture insensitivity of the coated manganese-doped phosphor and, conversely, the extreme moisture sensitivity of the standard, uncoated phosphor.

EXAMPLE 8

This example demonstrates the effectiveness of the coating when applied to another copper-doped ZnS-based electroluminescent material, Type 728 ZnS:Cu, manufactured and marketed by Sylvania. Electroluminescent lamps were fabricated upon sheets of ITO-coated polyester and subsequently heat-sealed between two sheets of a relatively water-permeable polyester material (obtained from General Binding Corp.). Two ZnS:Cu electroluminescent phosphors were used: Sylvania Type 723 (Lot ELB398) and Sylvania Type 728 (Lot ELB418). Identical lamps were fabricated using the as-received phosphors and the phosphors coated following the reaction conditions outlined above. The coated version of Type 723, Sample 72090, contained an equivalent $Al(OH)_3$ loading of 5.70% while the coated version of Type 728, Sample No. 80290, contained a 6.87% equivalent $Al(OH)_3$ loading. All of the lamps were evaluated using a 120 VAC power supply operated at 400 Hz. Lamp brightnesses were measured as a function of time using a calibrated optometer.

Figure 21:
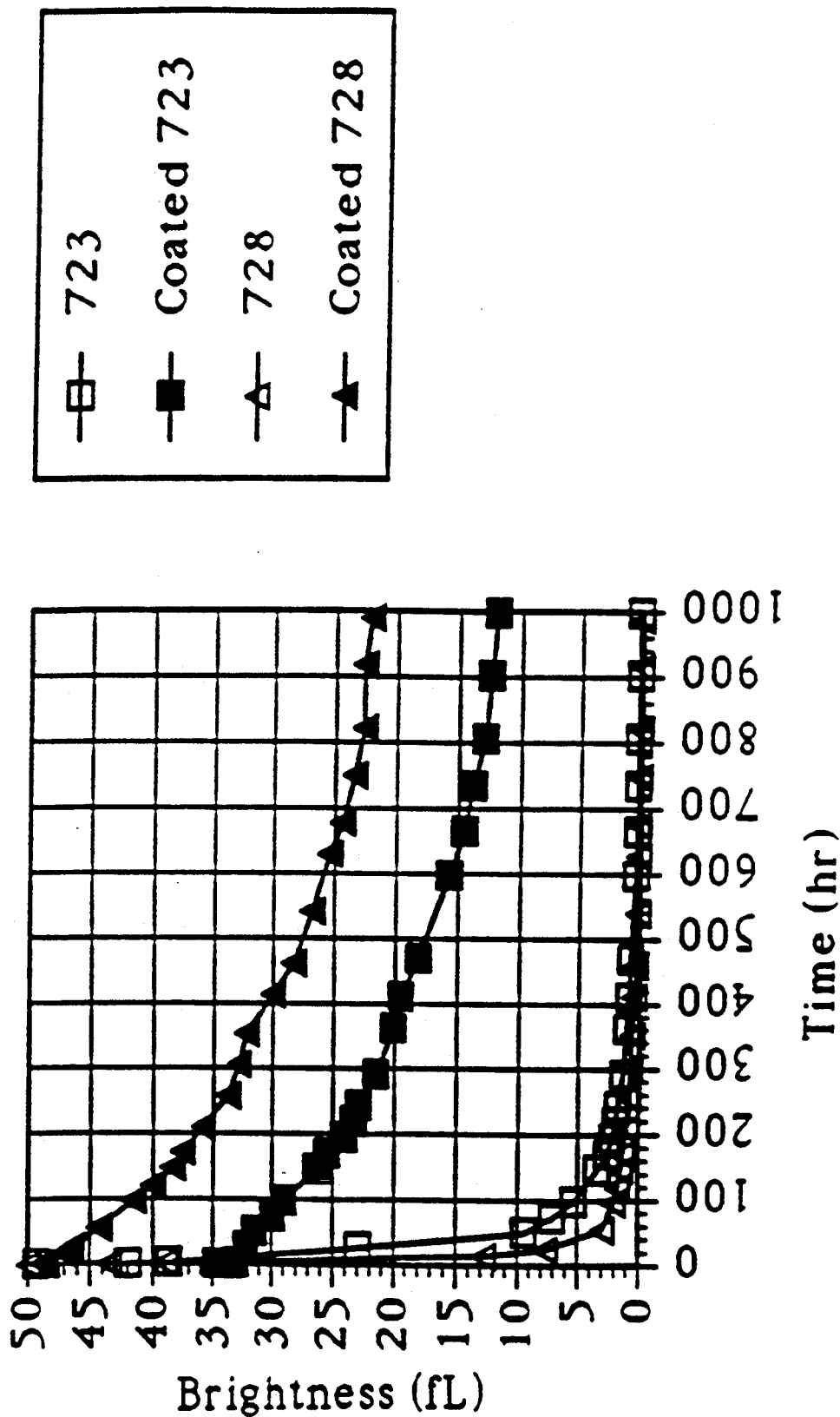
FIG. 21 compares EL lamp data for polyester packaged TMA coated phosphors with an aluminum content equivalent to 5.7% and 6.9% Al(OH)$_3$ and uncoated phosphor.

The brightness versus time data obtained with the lamps fabricated with the uncoated and coated phosphors are compared in FIG. 21. As shown, somewhat higher initial brightnesses were measured with the lamps containing the uncoated phosphors. However, after several hours of operation, the brightnesses of the lamps containing both coated phosphors exceeded those of the lamps containing both uncoated phosphors. The difference in brightness between the coated and uncoated phosphor-containing lamps increases with time of operation. Thus, both copper-doped phosphors Type 723 and Type 728 are rendered moisture-insensitive via the application of a hydrolyzed TMA coating. Further, the brightnesses of non-hermetically packaged electroluminescent lamps containing Sylvania Type 728 ZnS:Cu phosphor coated with hydrolyzed TMA as described herein are substantially greater than are obtained with identically constructed and packaged lamps containing Sylvania Type 723 ZnS:Cu phosphor similarly coated with hydrolyzed TMA.

EXAMPLE 9

This example demonstrates the effectiveness of the coating when applied to another copper-doped ZnS-based electroluminescent material, Type 729 ZnS:Cu, manufactured and marketed by Sylvania. Electroluminescent lamps were fabricated upon sheets of ITO-coated polyester using two ZnS:Cu electroluminescent phosphors: Sylvania Type 728 (Lot ELB418) and Sylvania Type 729 (Lot ELB396). Identical lamps were fabricated using the as-received phosphors and the phosphors coated following the reaction conditions outlined above. The coated versions of the Type 728 and Type 729 phosphors, Samples 82290 and 82390, respectively, each contained an equivalent $Al(OH)_3$ loading of approximately 6.5%. The lamps containing the as-received uncoated phosphors were heat-sealed between two sheets of a relatively water-impermeable plastic (Aclar, a product of Allied Signal Corp.) The lamps containing the coated phosphors, on the other hand, were packaged between sheets of a relatively water-permeable polyester material (obtained from General Binding Corp.) All of the lamps were evaluated using a 120 VAC power supply operated at 400 Hz. Lamp brightnesses were measured as a function of time using a calibrated optometer.

Figure 22:
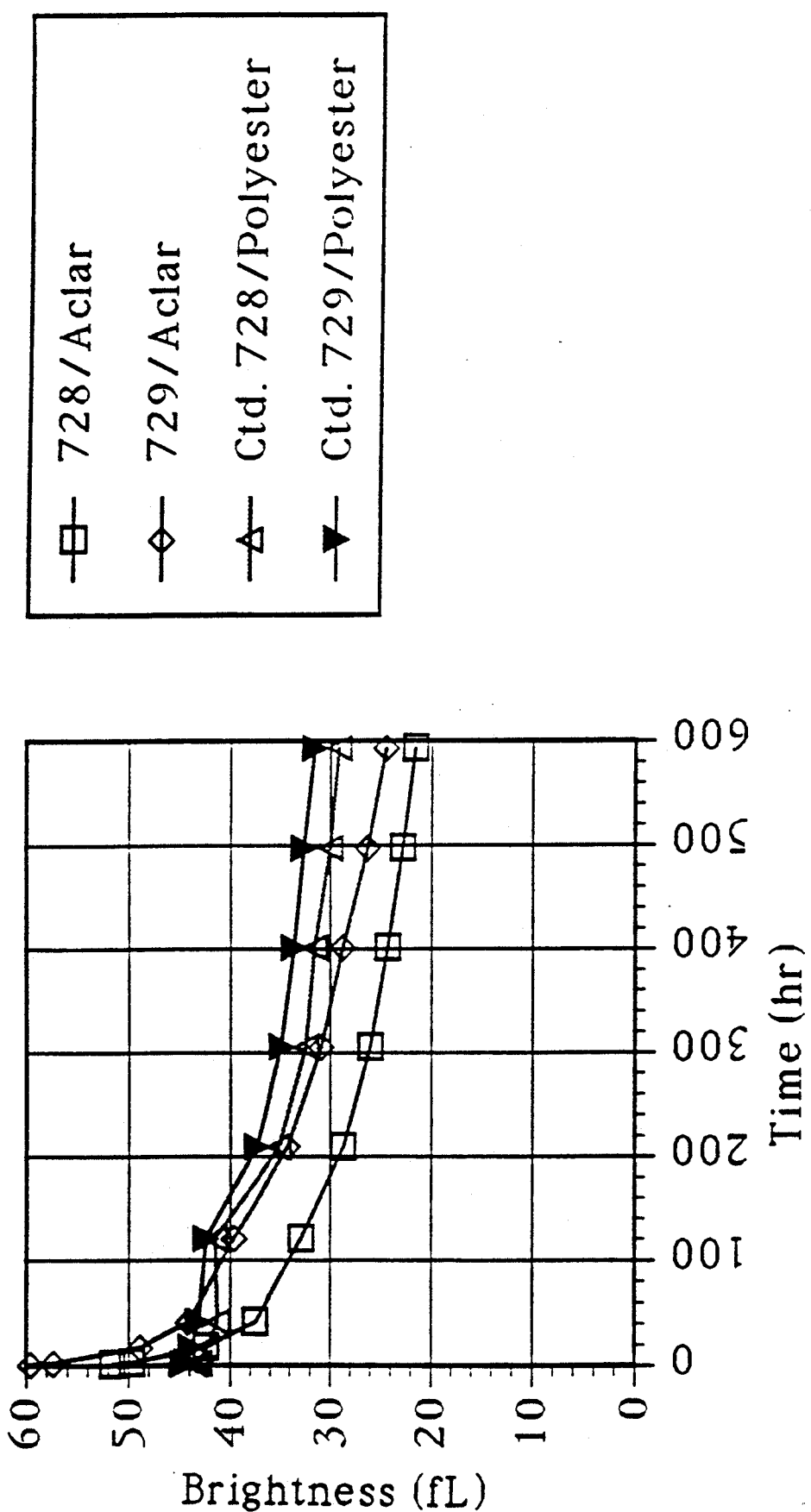
FIG. 22 compares EL lamp data for Aclar packaged uncoated phosphor and polyester packaged hydrolyzed TMA coated phosphor.

The brightness versus time data obtained with the lamps fabricated with the uncoated and coated phosphors are compared in FIG. 22. As shown, somewhat higher initial brightnesses were measured with the Aclar-packaged lamps containing the uncoated phosphors. However, after several hours of operation, the brightnesses of the polyester-packaged lamps containing the coated phosphors exceeded those of the lamps containing the uncoated phosphors. These data clearly demonstrate the remarkable moisture insensitivity of both phosphor types after the application of the hydrolyzed TMA coating.

EXAMPLE 10

This example demonstrates the EL-lamp performance of a ZnS-based electroluminescent material is unaffected by water washing either before or after the application of a hydrolyzed TMA coating formed as described above. Electro-luminescent lamps were fabricated upon sheets of ITO-coated polyester using Sylvania Type 729 ZnS:Cu EL phosphor (Lot ELB396). Identical lamps were fabricated using the uncoated phosphor, either as received or after a water wash followed by vacuum drying, and the phosphor coated following the reaction conditions outlined above, either as-coated or after a water wash followed by vacuum drying. The coated version of the phosphor, Sample 82390, contained an equivalent $Al(OH)_3$ loading of approximately 6.5%. The lamps containing the uncoated phosphor were heat-sealed between two sheets of a relatively water-impermeable plastic (Aclar, a product of Allied Signal Corp.). The lamps containing the coated phosphor, on the other hand, were packaged between sheets of a relatively water-permeable polyester material (obtained from General Binding Corp.). All of the lamps were evaluated using a 120 VAC power supply operated at 400 Hz. Lamp brightnesses were measured as a function of time using a calibrated optometer.

Figure 23:
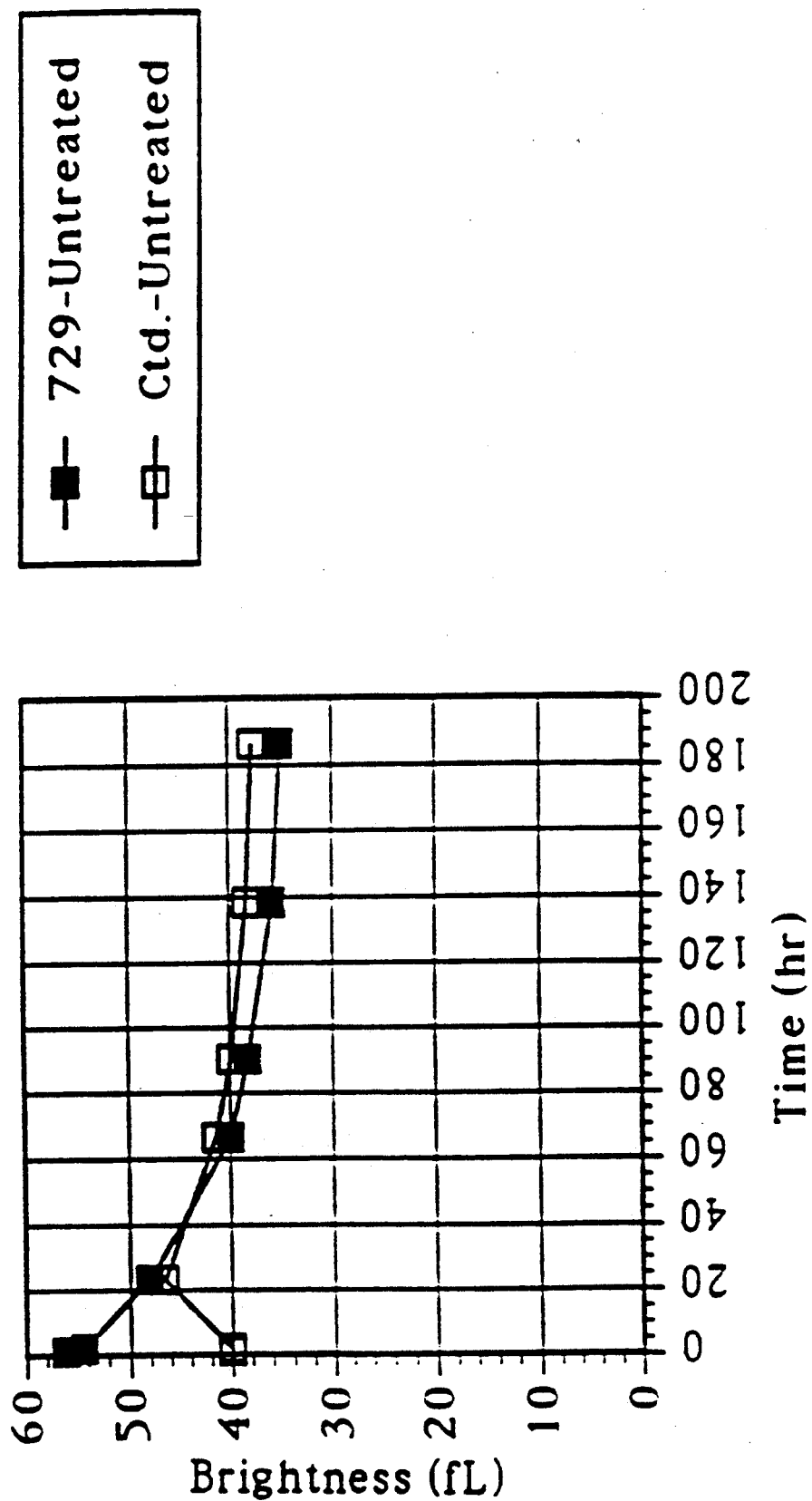
FIG. 23 compares EL lamp data for Aclar packaged uncoated phosphor and polyester packaged hydrolyzed TMA coated phosphor.
Figure 24:
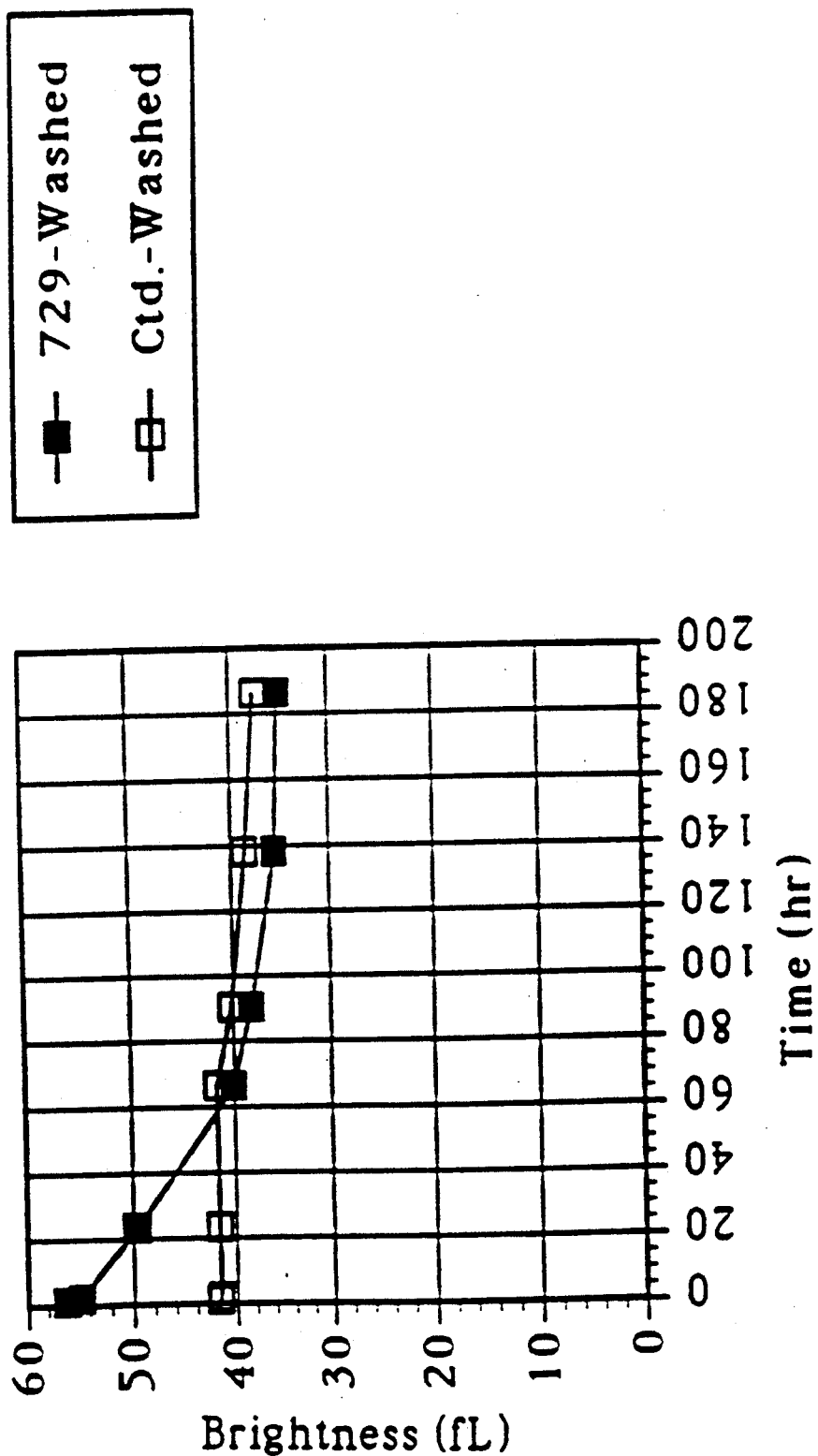
FIG. 24 compares EL lamp data for Aclar packaged washed uncoated phosphor and polyester packaged washed hydrolyzed TMA coated phosphor.

The brightness versus time data obtained with the untreated uncoated phosphor in Aclar-packaged lamps and with the untreated coated phosphor in polyester-packaged lamps are compared in FIG. 23. The data obtained with the water-washed uncoated phosphor in Aclar packaged lamps and with the water-washed coated phosphor in polyester-packaged lamps are similarly compared in FIG. 24. These data demonstrate not only that the coated phosphor is insensitive to the effects of moisture in an operating electroluminescent lamp, but that the effectiveness of the coating is undiminished by immersion in water (followed by drying) prior to lamp fabrication.

EXAMPLE 11

The purpose of this example is to illustrate the fact that the properties of the hydrolyzed TMA coating formed according to the teachings of this invention are substantially different from those that would be expected by one skilled in the chemical art. The reaction between TMA and water at temperatures no higher than a few hundred degrees Centigrade should result in the formation of aluminum hydroxide and methane:

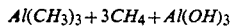

$$Al(CH_3)_3 + 3CH_4 + Al(OH)_3$$

The Al(OH)$_3$ produced by this low temperature reaction is expected to be substantially amorphous. Electron diffraction analyses of a number of ZnS-based phosphors coated via the TMA hydrolysis reaction carried out in a gas-fluidized bed have revealed no evidence of crystallinity, in agreement with this expectation. However, XPS surface analyses of several of the coated phosphor materials have yielded O/Al atomic ratios of approximately 1.3, far from the 3.0 value expected for Al(OH)$_3$ but close to the 1.5 value expected for Al$_2$O$_3$ as shown in Table 3.

Figure 25:
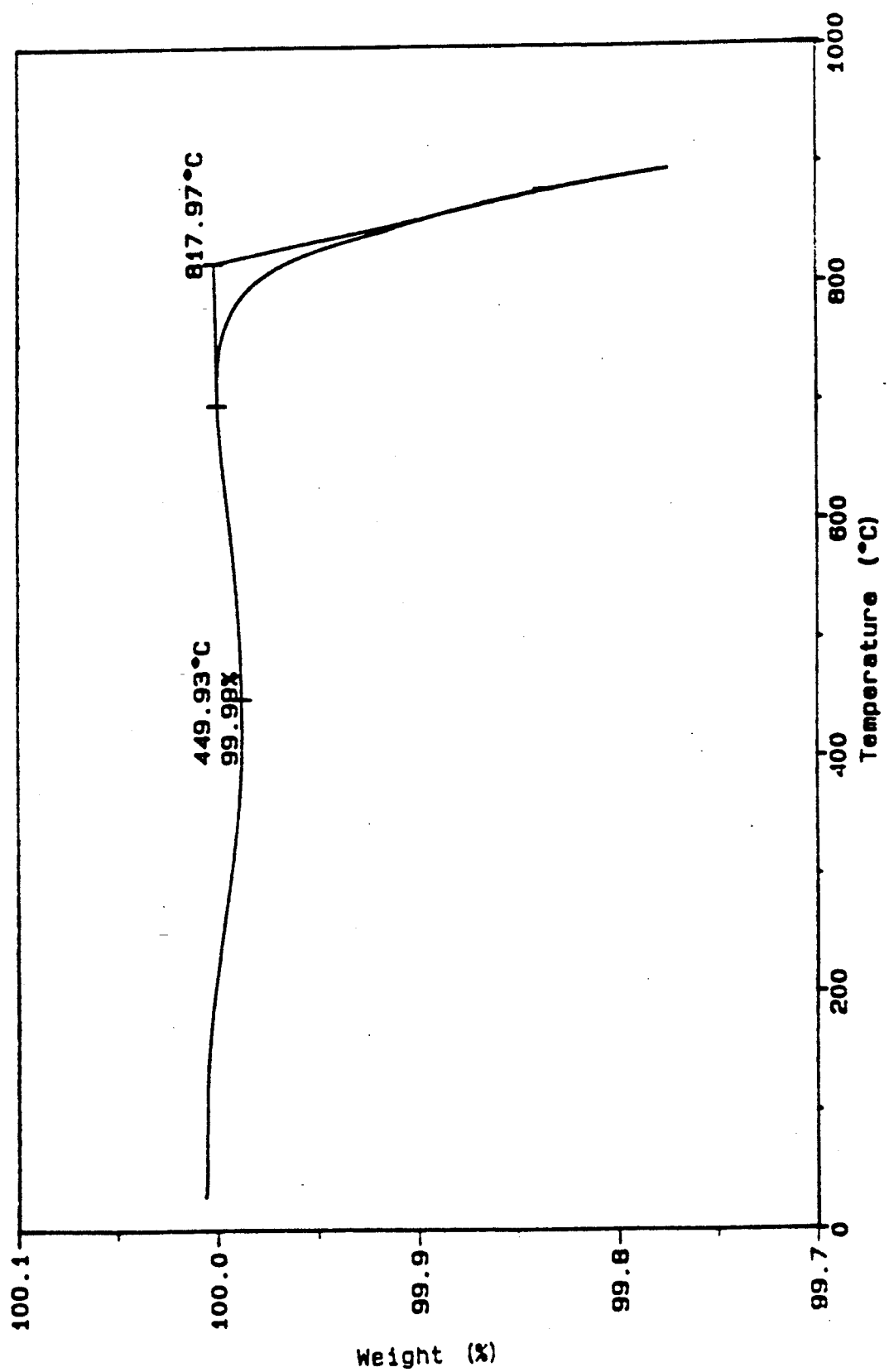
FIG. 25 shows thermogravimetric data for an uncoated phosphor.
Figure 26:
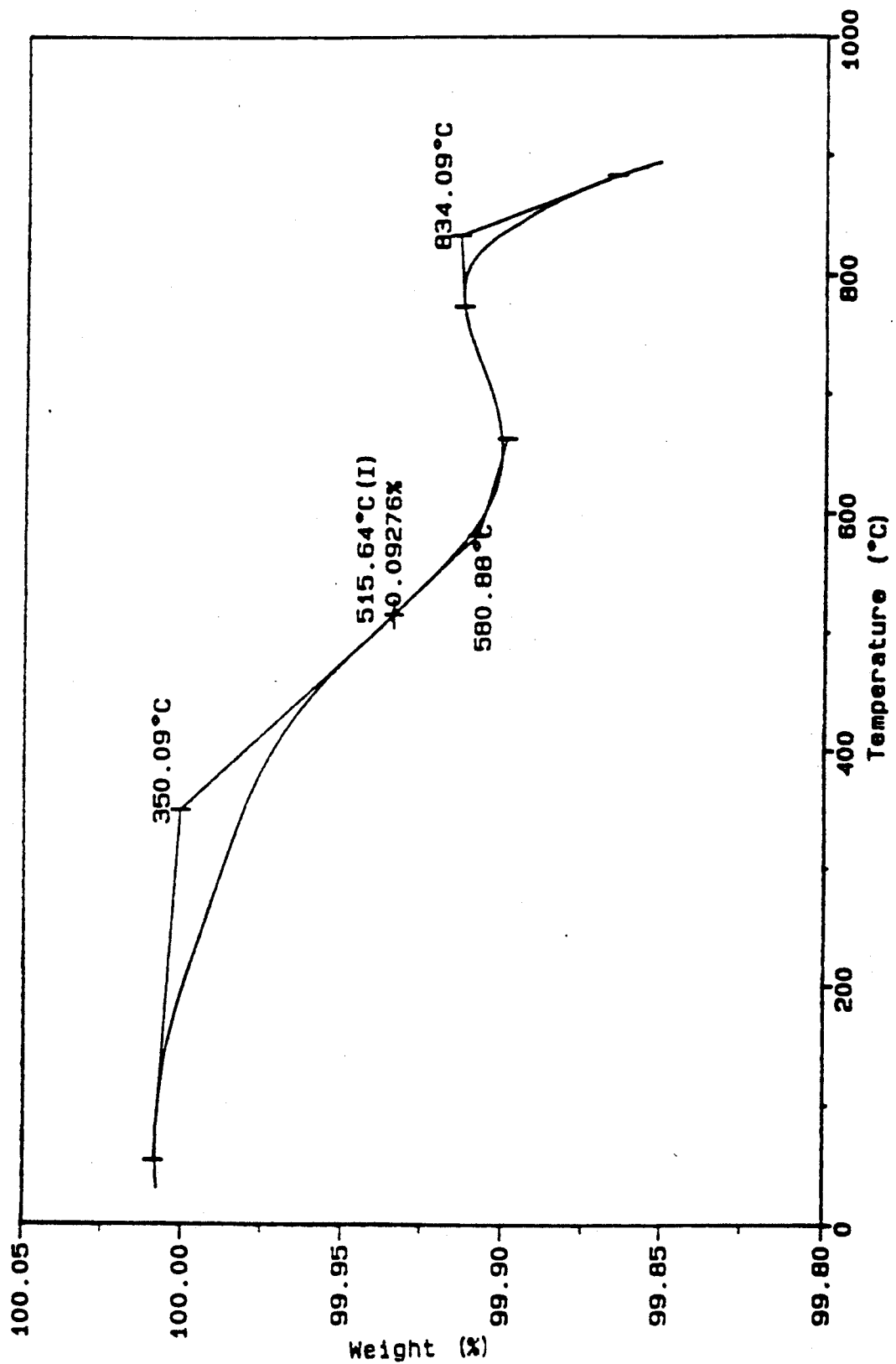
FIG. 26 shows thermogravimetric data for a hydrolyzed TMA coated phosphor.

Thermogravimetric analyses have also been performed with a number of coated phosphor samples. Typical TGA data obtained with a sample of uncoated Type 723 phosphor heated to above 800° C. at a 10° C./min. ramp rate are shown in FIG. 25. As expected, the percent weight change versus temperature plot is essentially flat, indicating that the sample did not gain or lose weight significantly during the analysis. Comparable data obtained with a sample of Type 723 phosphor coated via the TMA hydrolysis reaction (sample 40390 with a coating containing an amount of aluminum equivalent to 3.0% Al(OH)$_3$) are similarly plotted in FIG. 26. In this case, an approximate 0.1% weight loss is detected occurring at temperatures between 350° and 600° C. Indeed, this is the temperature range over which amorphous Al(OH)$_3$ would be expected to transform to Al$_2$O$_3$ when so heated. However, for a material containing 3.0% Al(OH)$_3$, the complete conversion of the amorphous hydroxide coating to an oxide phase by the elimination of water vapor would result in an approximate 1.0% weight loss, an order of magnitude greater than is observed. Similar results have been obtained in a number of other TGA experiments with ZnS-based materials coated via the TMA hydrolysis reaction. Thus, the TGA data suggest that the coating behaves more like an oxide than a hydroxide, contrary to our expectations.

Finally, there is the fact that the effectiveness of the coating formed at 200° C. is completely unaffected by water washing as described in Example 10 above. If the coating were an oxide formed at much higher temperatures, perhaps via the high temperature heat treatment of an amorphous hydroxide, this result would not be surprising. However, it is surprising indeed that a relatively thin amorphous aluminum hydroxide coating formed at 200° C. should be apparently unaffected by this procedure.

Thus, whereas one skilled in chemistry would expect that a coating formed via the reaction of TMA with water vapor at a temperature in the vicinity of 200° C. would consist essentially of amorphous aluminum hydroxide, all of the evidence accumulated to date conflicts with that expectation. Rather, the accumulated evidence suggests that the coating so formed upon the surfaces of ZnS-based phosphor particles suspended within a gas-fluidized bed (as described in this disclosure) consists substantially of some unidentified compound of aluminum and oxygen.

It is considered likely that coatings formed via a gas-phase reaction between TMA and H$_2$O might also be effective in protecting so-called thin-film EL devices from moisture attack. Such thin-film EL devices typically contain layers of conducting, dielectric, and luminescent materials that may be formed via gas-phase reactions not at all unlike the TMA/H$_2$O reaction used to form the moisture-protective barriers described above. Thus, at least in principle, it would be relatively simple to incorporate such TMA/H$_2$O reactions into existing manufacturing processes to form one or more thin moisture-protective barrier layers that become integral parts of such EL devices. The TMA/H$_2$O reaction carried out at a temperature between 100° C. and 300° C. might be used to coat the thin polycrystalline phosphor film before applying the final insulating and conductive electrode layers. It may even be possible to entirely eliminate the insulating layer from such devices since, to the best of our knowledge, the coatings formed via the TMA/H$_2$O reaction are themselves electrically insulating.

While there has been shown and described what are at present considered the preferred embodiments of the invention, it will be obvious to those skilled in the art that various changes and modifications may be made therein without departing from the scope of the invention as defined by the appended claims, specifically the use of other alkylaluminums such as triethylaluminum or the use of a stirred-bed rather than a fluidized-bed reactor.

What is claimed is:

1. A method for forming a continuous coating of on phosphor particles comprising:
   a) vaporizing trimethyl aluminum in a carrier gas to form a carrier gas containing vaporized trimethyl aluminum;
   b) vaporizing water in a carrier gas to form a carrier gas containing vaporized water;
   c) passing said carrier gas containing vaporized trimethyl aluminum and said carrier gas containing vaporized water through a finely divided phosphor powder in which phosphor particles are suspended in the carrier gases and to envelop the fluidized particles in said carrier gas containing vaporized trimethyl aluminum and said carrier gas containing vaporized water; and
   d) reacting the vaporized trimethyl aluminum and the vaporized water on the particles of the phosphor powder to form a continuous coating comprising hydrolyzed trimethyl aluminum of predetermined thickness on the phosphor particles.

2. The method according to claim 1 wherein the fluidized bed is maintained at a temperature of less than 300° C.

3. The method according to claim 1 wherein the phosphor powder comprises zinc sulfide.

4. A method for forming a continuous coating on particles of a finely divided material comprising:
 a) vaporizing an aluminum-containing material selected from the group consisting of trimethylaluminum and triethylaluminum in an inert carrier gas to form a gas containing a vaporized aluminum-containing material;
 b) vaporizing water in a carrier gas to form a carrier gas containing vaporized water;
 c) passing said carrier gas containing vaporized aluminum-containing material and said carrier gas containing vaporized water through a finely divided material in which particles of the finely divided material are suspended in the carrier gases wherein the aluminum-containing material reacts with the water on surfaces of the finely divided material to form a continuous coating comprising hydrolyzed trimethyl aluminum or hydrolyzed triethyl aluminum of predetermined thickness on the finely divided material.

5. The method according to claim 4 wherein the finely divided material comprises phosphor particles.

6. The method according to claim 5 wherein the phosphor particles comprise copper activated zinc sulfide.

7. The method according to claim 5 wherein the fluidized bed is maintained at a temperature of less than 300° C.

* * * * *